US012580923B2

(12) United States Patent
He et al.

(10) Patent No.: US 12,580,923 B2
(45) Date of Patent: Mar. 17, 2026

(54) PRIVACY PROTECTION METHOD AND APPARATUS FOR SOCIAL NETWORK, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Fen He, Shenzhen (CN); Yaxin Yong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 53 days.

(21) Appl. No.: 18/624,440

(22) Filed: Apr. 2, 2024

(65) Prior Publication Data

US 2024/0250950 A1     Jul. 25, 2024

Related U.S. Application Data

(63) Continuation of application No. PCT/CN2023/083328, filed on Mar. 23, 2023.

(30) Foreign Application Priority Data

May 13, 2022     (CN) .......................... 202210524804.6

(51) Int. Cl.
H04L 29/06          (2006.01)
G06F 3/0482          (2013.01)
(Continued)

(52) U.S. Cl.
CPC .......... H04L 63/104 (2013.01); G06F 3/0482 (2013.01); H04L 51/52 (2022.05); H04L 63/04 (2013.01)

(58) Field of Classification Search
None
See application file for complete search history.

(56) References Cited

U.S. PATENT DOCUMENTS

2013/0276134 A1* 10/2013 Meredith ............ G06F 21/6218
                                                                726/27
2021/0374157 A1  12/2021 Reddy et al.
2023/0275955 A1*  8/2023 Xiang ..................... H04L 67/06
                                                                709/203

FOREIGN PATENT DOCUMENTS

CN          111368329 A  *  7/2020  ............ H04L 51/52
CN          111581664 A     8/2020
CN          113840035 A     12/2021

OTHER PUBLICATIONS

The World Intellectual Property Organization (WIPO) International Search Report for PCT/CN2023/083328 Jul. 1, 2023 6 Pages (including translation).

* cited by examiner

*Primary Examiner* — Andrew J Steinle
(74) *Attorney, Agent, or Firm* — Anova Law Group, PLLC

(57)          ABSTRACT

A privacy protection method performed by an electronic device includes displaying, in response to a configuration operation with respect to an information sharing permission for a social network, a configuration result of the information sharing permission, and displaying target information in response to a trigger operation for transmitting the target information, including displaying the target information in a first display mode in response to the configuration result representing that the target information is configured with the information sharing permission, and displaying the target information in a second display mode different from the first display mode in response to the configuration result (Continued)

representing that the target information is not configured
with the information sharing permission.

20 Claims, 26 Drawing Sheets

(51) Int. Cl.
  *H04L 9/40* (2022.01)
  *H04L 51/52* (2022.01)

Display, in response to a configuration operation for an information sharing permission for a social network, a configuration result of the information sharing permission ⌐101

Display target information in response to a trigger operation for transmitting the target information ⌐102

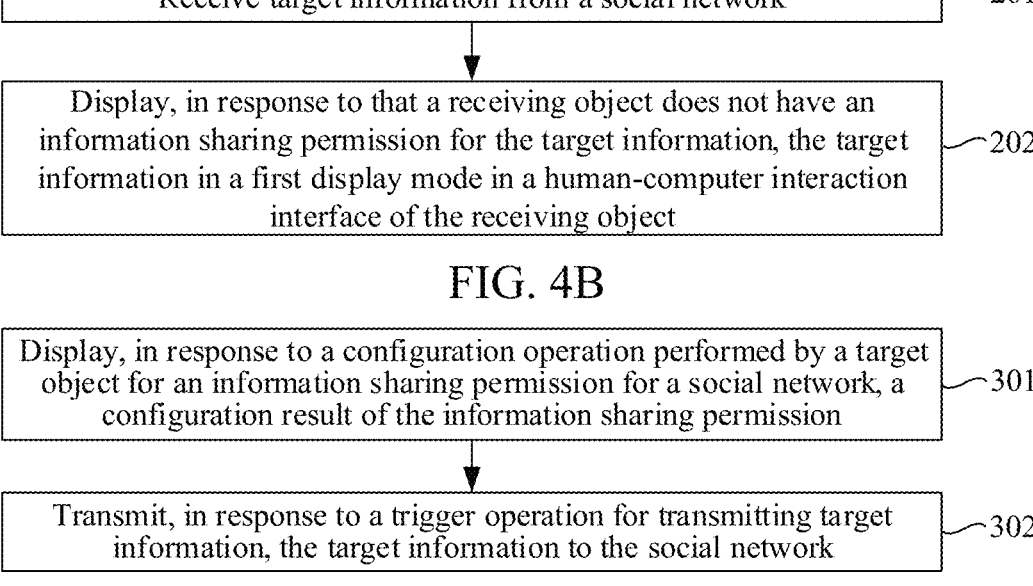

| Receive target information from a social network | 201 |

| Display, in response to that a receiving object does not have an information sharing permission for the target information, the target information in a first display mode in a human-computer interaction interface of the receiving object | 202 |

FIG. 4B

| Display, in response to a configuration operation performed by a target object for an information sharing permission for a social network, a configuration result of the information sharing permission | 301 |

| Transmit, in response to a trigger operation for transmitting target information, the target information to the social network | 302 |

PRIVACY PROTECTION METHOD AND APPARATUS FOR SOCIAL NETWORK, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation of International Application No. PCT/CN2023/083328, filed on Mar. 23, 2023, which claims priority to Chinese Patent application Ser. No. 20/221,0524804.6 filed on May 13, 2022, the entire contents of both of which are incorporated herein by reference.

FIELD OF THE TECHNOLOGY

This application relates to the privacy protection technologies, and in particular, to a privacy protection method and apparatus for a social network, an electronic device, a computer-readable storage medium, and a computer program product.

BACKGROUND OF THE DISCLOSURE

With the development of Internet technologies, more and more people chat and communicate through social networks or publish dynamic messages through social networks. Therefore, users may transmit and receive various information, for example, text information, image information, emoticon information, video information, and audio information, through the social networks.

In online information transmitting and receiving processes, information transmitted and received may be private information. That is, a user expects that transmitted information can only be received by a receiving object, and the information may not be disseminated by the receiving object. In the related art, the user can only inform the receiving object to keep the information confidential, and cannot ensure that the information will not be disseminated by the receiving object.

SUMMARY

In accordance with the disclosure, there is provided a privacy protection method performed by an electronic device and including displaying, in response to a configuration operation with respect to an information sharing permission for a social network, a configuration result of the information sharing permission, and displaying target information in response to a trigger operation for transmitting the target information, including displaying the target information in a first display mode in response to the configuration result representing that the target information is configured with the information sharing permission, and displaying the target information in a second display mode different from the first display mode in response to the configuration result representing that the target information is not configured with the information sharing permission.

Also in accordance with the disclosure, there is provided an electronic device including one or more processors and one or more memories storing one or more computer-executable instructions that, when executed by the one or more processors, cause the electronic device to display, in response to a configuration operation with respect to an information sharing permission for a social network, a configuration result of the information sharing permission, and display target information in response to a trigger operation for transmitting the target information, including displaying the target information in a first display mode in response to the configuration result representing that the target information is configured with the information sharing permission and displaying the target information in a second display mode different from the first display mode in response to the configuration result representing that the target information is not configured with the information sharing permission.

Also in accordance with the disclosure, there is provided a non-transitory computer-readable storage medium storing one or more computer-executable instructions that, when executed by one or more processors, cause the one or more processors to display, in response to a configuration operation with respect to an information sharing permission for a social network, a configuration result of the information sharing permission, and display target information in response to a trigger operation for transmitting the target information, including displaying the target information in a first display mode in response to the configuration result representing that the target information is configured with the information sharing permission and displaying the target information in a second display mode different from the first display mode in response to the configuration result representing that the target information is not configured with the information sharing permission.

BRIEF DESCRIPTION OF THE DRAWINGS

FIG. 3 is a schematic structural diagram of an electronic device according to an embodiment of this application.

FIG. 4A to FIG. 4C are schematic flowcharts of a privacy protection method for a social network according to an embodiment of this application.

DESCRIPTION OF EMBODIMENTS

To make the objectives, technical solutions, and advantages of this application clearer, the following further describes this application in detail with reference to the accompanying drawings. The described embodiments are not to be regarded as limitations on this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" maybe the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, all technical and scientific terms used herein have the same meanings as commonly understood by a person skilled in the art to which this application belongs. Terms used in this specification are merely intended to describe objectives of the embodiments of this application, but are not intended to limit this application.

Before the embodiments of this application are further described in detail, terms included in the embodiments of this application are described, and the following explanations are applicable to the terms included in the embodiments of this application 1) "In response to": configured for representing a condition or status on which one or more to-be-performed operations depend. In a case that the condition or status is satisfied, the one or more operations may be performed in real time or after a set delay. Unless otherwise specified, there is no restriction on an order in which a plurality of operations are performed.

2) Chat information: all information generated during chatting, including includes text, pictures/videos, emoticons, voice files, and the like. In a chat scenario, all information generated during chatting is carried in a message for transmitting and receiving. For example, a message carrying specific text information is transmitted, or a message carrying a specific emoticon is received.

3) Sharing operation: any behavior that can share information with a friend or another platform, including, but not limited to, a forwarding operation, an add-to-favorites operation or a saving operation, a sharing link or two-dimensional code generation operation, and a screenshot operation.

Figure 1:
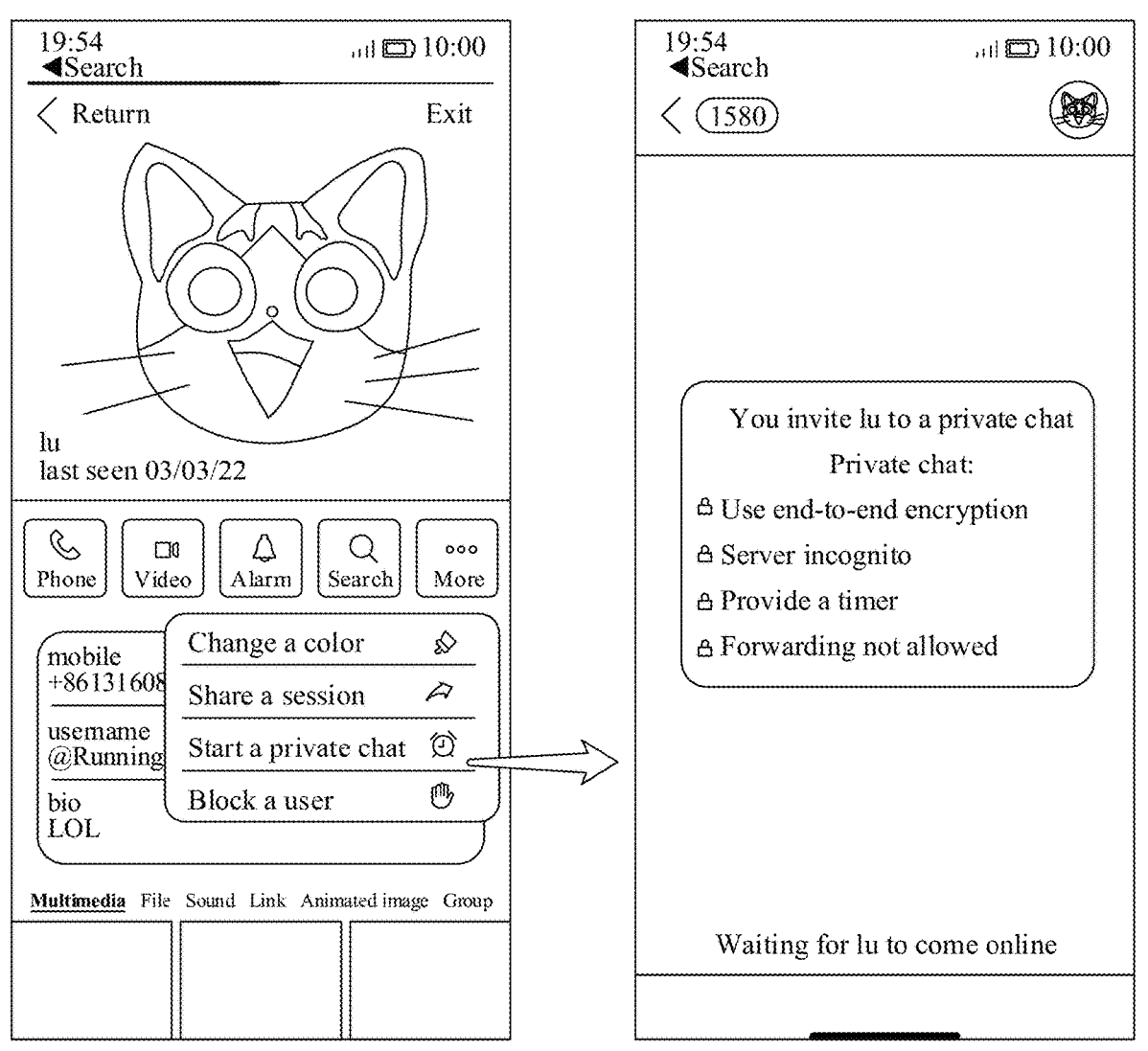
FIG. 1 is a schematic diagram showing an interface of a privacy protection method for a social network in the related art.

In a social chat scenario, in the related art, a secret chat mode may be provided during chatting. In a case that the secret chat mode is started, an independent secret chat window may pop up, and the secret chat window is opened only in a case that another party is online. Referring to FIG. 1, in the secret chat mode, all session information is automatically cleared and destroyed at both transmit and receive ends, and a screenshot is not supported. During implementation of the embodiments of this application, the applicant finds that in the related art, a new chat window is needed to ensure the privacy of the information, and it is also necessary to clear chat information to ensure the privacy of the chat information. An operation of opening a new chat window occupies additional social resources, and cannot be adapted to all scenarios, for example, an office scenario of business communication. After the chat information is automatically deleted, both parties cannot review the chat information subsequently. The private chat can only be performed with an online friend, and cannot be applied to a multi-person chat scenario. In addition, a personalized sharing permission cannot be set for a specific type of information individually.

To resolve the foregoing technical problems, the embodiments of this application provide a privacy protection method and apparatus for a social network, an electronic device, a computer-readable storage medium, and a computer program product, to improve privacy security of information transmitting in a social network.

An exemplary application of the electronic device provided in the embodiments of this application is described below. The electronic device provided in the embodiments of this application may be implemented as various user terminals such as a notebook computer, a tablet computer, a desktop computer, a set-top box, a mobile device (for example, a mobile phone, a portable music player, a personal digital assistant, a dedicated information appliance, or a portable game device), an intelligent voice interaction device, an intelligent household appliance, an in-vehicle terminal, and an aircraft.

Figure 2:
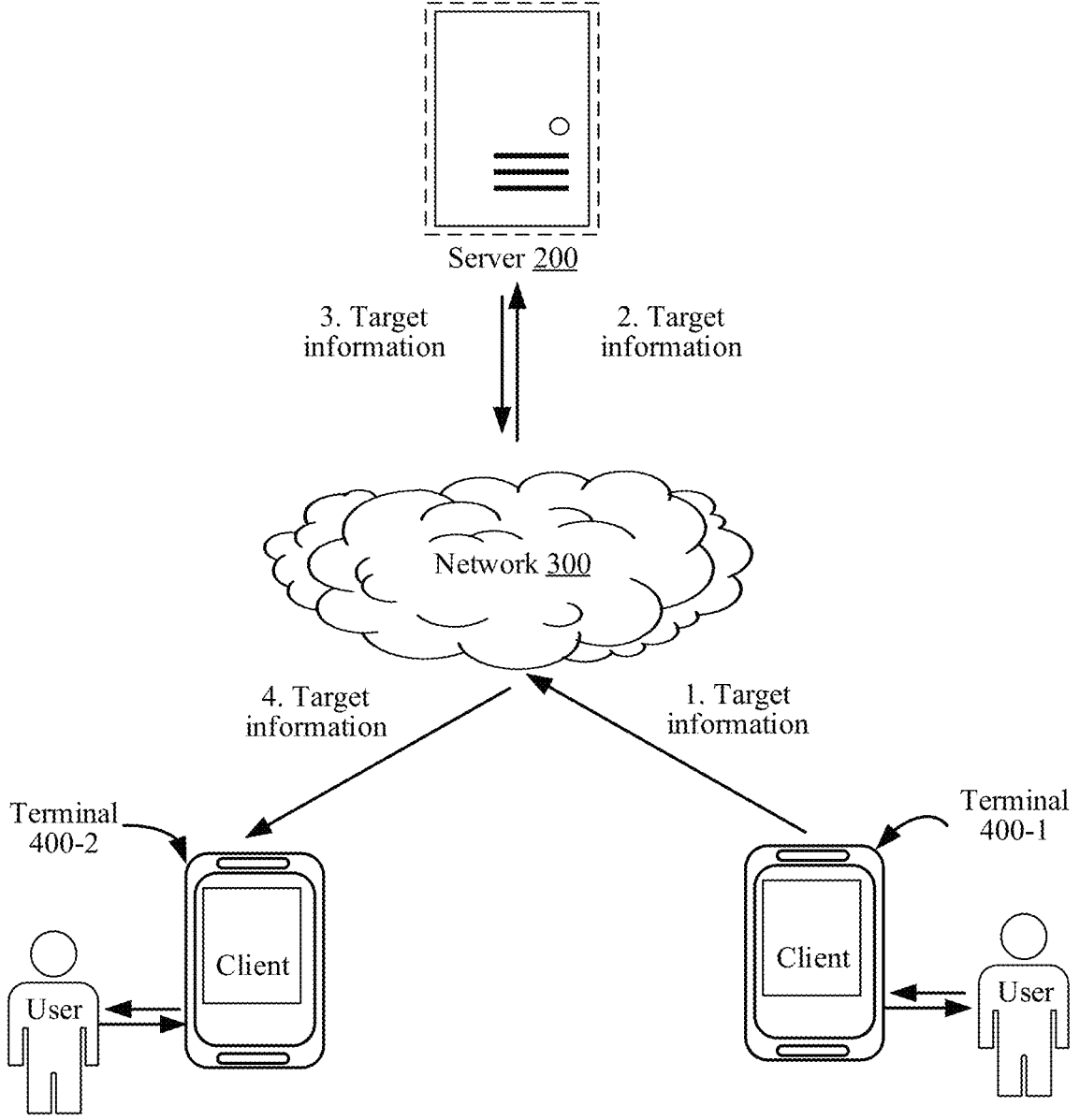
FIG. 2 is a schematic structural diagram of a privacy protection system for a social network according to an embodiment of this application.

FIG. 2 is a schematic structural diagram of a privacy protection system for a social network according to an embodiment of this application. To support a social application, terminals (for example, a terminal 400-1 and a terminal 400-2 are shown) are connected to a server 200 by a network 300. The network 300 may be a wide area network, a local area network, or a combination of the two.

In some embodiments, a terminal 400-1 of a target object A receives a configuration operation for information of a text type, and configures the information of a text type such that the information of a text type cannot be shared by a receiving object B. The terminal 400-1 of the target object A transmits target information to a terminal 400-2 of the receiving object B through the server 200. The target information is information of a text type. The target object is an object transmitting the target information. The target information is displayed in a social interface of the terminal 400-1, and a privacy identifier is displayed near the target information. The target information is displayed in a social interface of the terminal 400-2, and a privacy identifier is displayed near the target information. The terminal 400-2 receives a press-and-hold operation for the target information and displays a plurality of functional controls, but none of the displayed functional controls can be configured for saving or sharing the target information. The receiving object B cannot perform a sharing operation or an operation related to the sharing operation for the target information.

In some embodiments, a terminal or a server may implement the privacy protection method for a social network provided in the embodiments of this application by running a computer program. For example, the computer program may be a native program or a software module in an operating system. The computer program may be a native application (APP), that is, a program that needs to be installed in the operating system for running, for example, a social network client; or an applet, that is, a program that only needs to be downloaded into a browser environment for running; or an applet, that can be embedded into any APP. To sum up, the foregoing computer program may be an application, a module, or a plug-in in any form.

The embodiments of this application may be implemented with the help of the cloud technology. The cloud technology refers to a hosting technology that unifies a series of resources, such as hardware, software, and the network, within a wide area network or a local area network to implement computing, storage, processing, and sharing of data.

The cloud technology is a general term for a network technology, an information technology, an integration technology, a management platform technology, an application technology, and the like that are applied based on the cloud computing business mode, and a resource pool may be formed and used as needed, which is flexible and convenient. The cloud computing technology becomes an important support. A background service of a technical network system requires a large amount of computing and storage resources.

In an example, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400-1 maybe a smartphone, a tablet computer, a notebook computer, a desktop computer, a smart speaker, a smartwatch, an intelligent voice interaction device, an intelligent household appliance, an in-vehicle terminal, an aircraft, or the like, but is not limited thereto. The terminal 400-1 and the server 200 may be directly or indirectly connected in a wired or wireless communication manner. This is not limited in the embodiments of this application.

Figure 13:
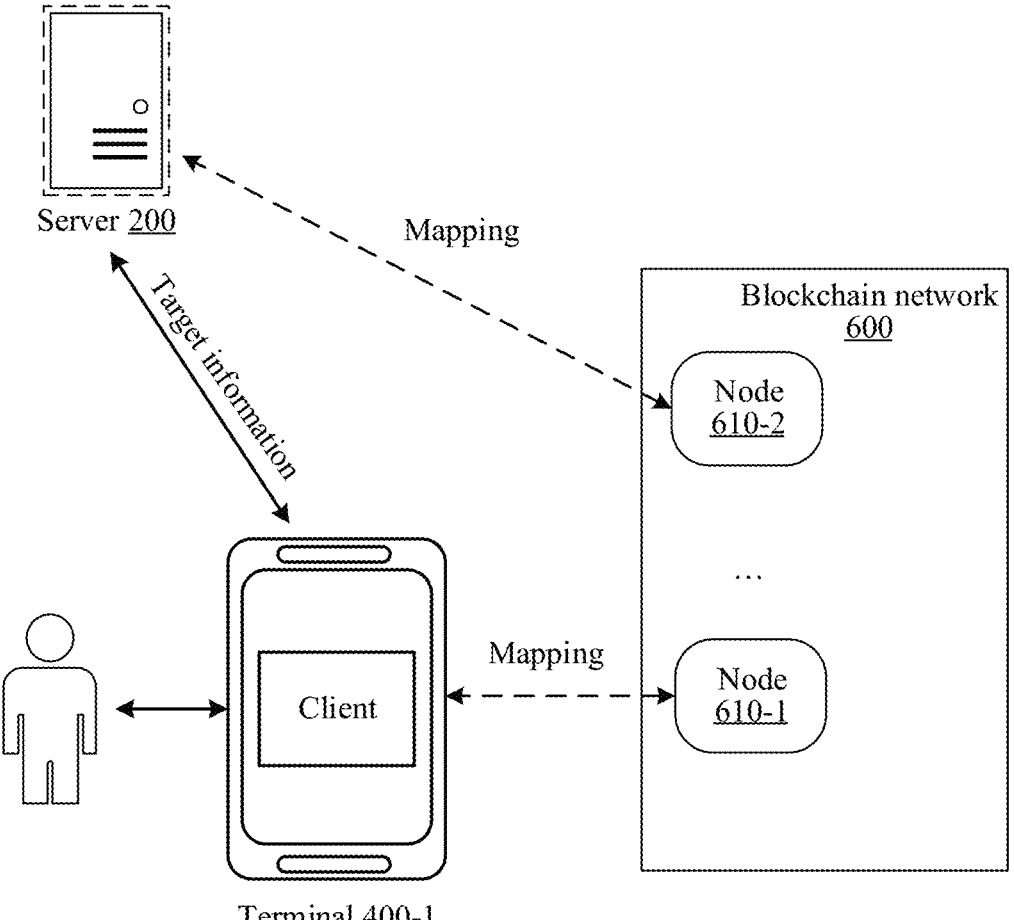
FIG. 13 is a schematic diagram showing a blockchain network according to an embodiment of this application.

A blockchain network-based exemplary application of the embodiments of this application is described below. FIG. 13 is a schematic diagram showing a blockchain network according to an embodiment of this application, including a blockchain network 600 (for example, it is shown that the blockchain network 600 includes a node 610-1 and a node 610-2), a server 200, and a terminal 400-1, which are respectively explained below.

The server 200 (mapped to the node 610-2) and the terminal 400-1 (mapped to the node 610-1) may both join the blockchain network 600 and become nodes in the blockchain network 600. FIG. 13 shows, for example, mapping the terminal 400-1 to the node 610-1 of the blockchain network 600. Each node (for example, the node 610-1 and the node 610-2) has a consensus function and an accounting (that is, maintaining a state database, for example, a key-value database) function.

An information sharing permission collected and configured by the terminal 400-1 is recorded in a state database of each node (for example, the node 610-1), so that the server 200 can query the information sharing permission recorded in the state database.

In some embodiments, in response to receiving a sharing operation for target information, a plurality of servers 200 (each server is mapped to a node in the blockchain network) determine whether the target information is configured with an information sharing permission, and with respect to whether the information sharing permission is configured, in a case that a quantity of nodes that achieve consensus exceeds a quantity of nodes threshold, determines that the consensus is achieved. For example, in a case that a quantity of nodes that consider the target information is configured with the information sharing permission exceeds the threshold, representing that the target information is private information, the server 200 (mapped to the node 610-2) transmits a result achieving the consensus and the target information to another terminal, to display the target information in a first display mode in human-computer interaction interfaces of the another terminal and the terminal 400-1. Because whether the target information is configured with the information sharing permission is determined after the consensus is achieved among the plurality of servers, the reliability of the result can be effectively improved.

Figures 3, 4A:
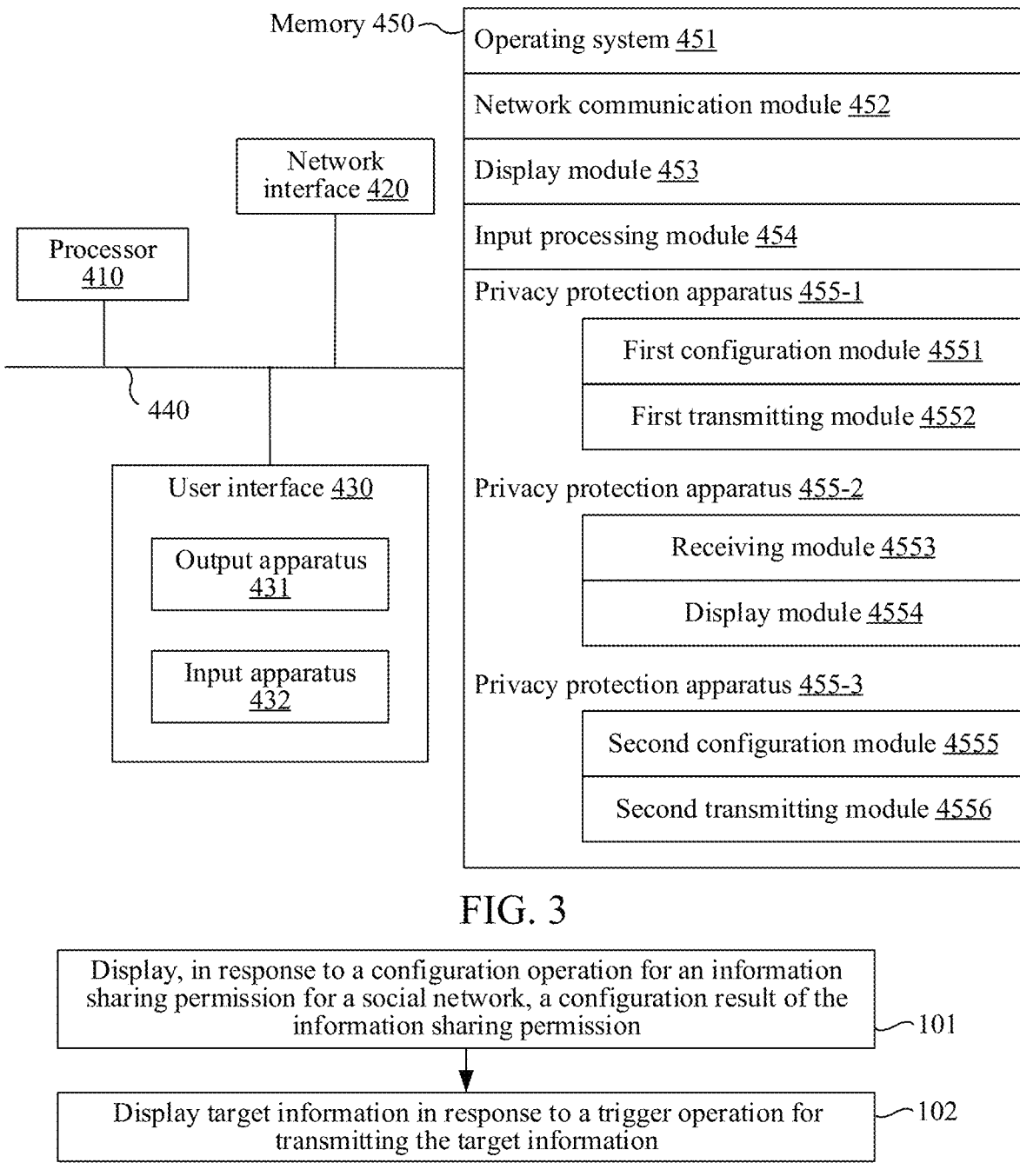

FIG. 3 is a schematic structural diagram of an electronic device according to an embodiment of this application. The terminal shown in FIG. 3 includes at least one processor 410, a memory 450, at least one network interface 420, and a user interface 430. Components in a terminal 400-1 are coupled together by a bus system 440. It may be understood that the bus system 440 is configured to implement connection and communication between the components. In addition to a data bus, the bus system 440 further includes a power bus, a control bus, and a status signal bus. However, for the sake of clarity, various buses are marked as the bus system 440 in FIG. 3.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 430 includes one or more output devices 431 that enable presentation of media content, including one or more speakers and/or one or more visualization display screens. The user interface 430 further includes one or more input apparatuses 432, including user interface components that facilitate inputting of a user, such as a keyboard, a mouse, a microphone, a touch display screen, a camera, and other input buttons and controls.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include a volatile memory and a non-volatile memory. The non-volatile memory may be a read-only memory (ROM). The volatile memory may be a random access memory (RAM). The memory 450 described in the embodiments of this application is intended to include memories of any other suitable types.

In some embodiments, the memory 450 may store data to support various operations. Examples of the data include programs, modules, and data structures, or a subset or a superset thereof, which are illustrated below.

An operating system 451 includes system programs configured to process various basic system services and execute hardware-related tasks, for example, a framework layer, a core library layer, and a driver layer, for implementing various basic services and processing hardware-based tasks.

A network communication module 452 is configured to reach another electronic device through one or more (wired or wireless) network interfaces 420. Exemplary network interfaces 420 include: Bluetooth, wireless compatible authentication (Wi-Fi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of one or more input devices 432 and translate the detected inputs or interactions.

In some embodiments, the privacy protection apparatus for a social network provided in the embodiments of this application may be implemented through software. FIG. 3 shows a privacy protection apparatus 455-1 for a social network stored in the memory 450. The privacy protection apparatus 455-1 for a social network may be software in a form such as a program and a plug-in and include the following software modules: a first configuration module 4551 and a first transmitting module 4552. FIG. 3 further shows a privacy protection apparatus 455-2 for a social network stored in the memory 450. The privacy protection apparatus 455-2 for a social network may be software in a form such as a program and a plug-in, and include the following software modules: a receiving module 4553 and a display module 4554. FIG. 3 further shows a privacy protection apparatus 455-3 for a social network stored in the memory 450. The privacy protection apparatus 455-3 for a social network may be software in a form such as a program and a plug-in, and include the following software modules: a second configuration module 4555 and a second transmitting module 4556. The modules are logical, and therefore, can be combined or further split according to the functions implemented. Functions of the modules are described below.

The privacy protection method for a social network provided in the embodiments of this application is described with reference to exemplary applications and implementations of the terminal provided in the embodiments of this application.

The privacy protection method for a social network provided in the embodiments of this application is described below. As stated above, an electronic device that implements the privacy protection method for a social network in this embodiment of this application may be a terminal. Therefore, an execution subject of the processes is not repeatedly explained below.

FIG. 4A is a schematic flowchart of a privacy protection method for a social network according to an embodiment of this application. Descriptions are provided with reference to the processes shown in FIG. 4A.

Process 101: Display, in response to a configuration operation for an information sharing permission for the social network, a configuration result of the information sharing permission.

Figure 12A:
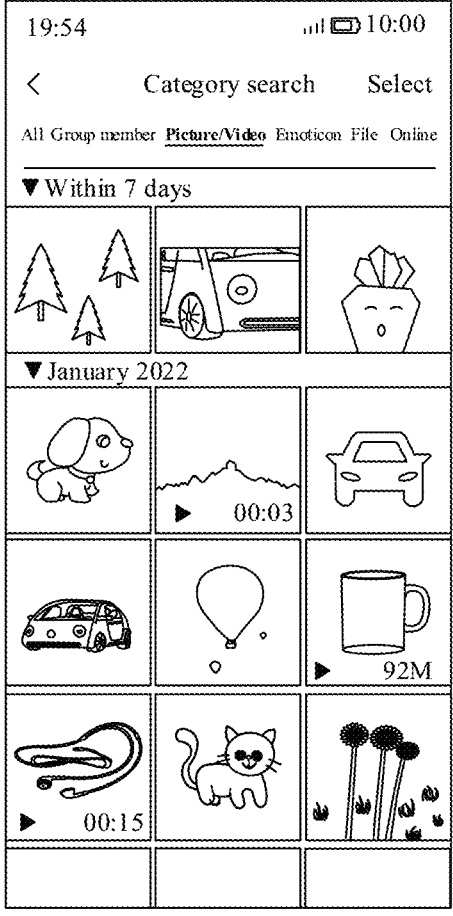
FIG. 12A to FIG. 12C are schematic diagrams showing information according to an embodiment of this application.
Figure 12B:
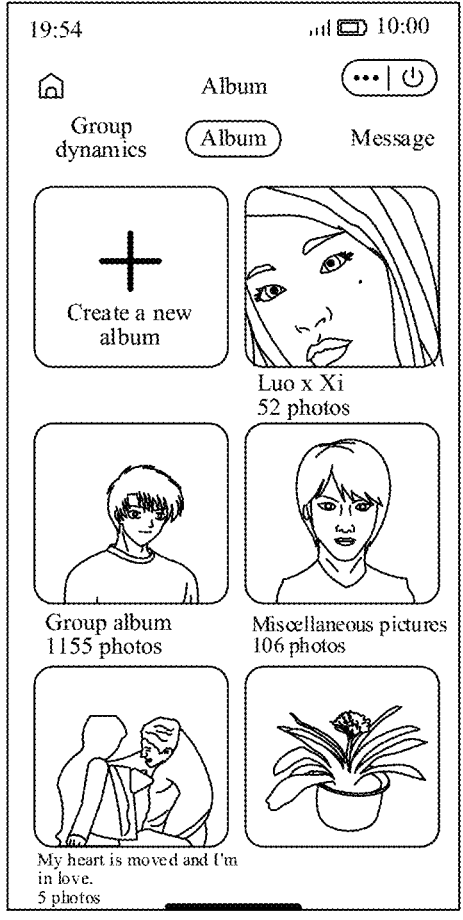
Figure 12C:
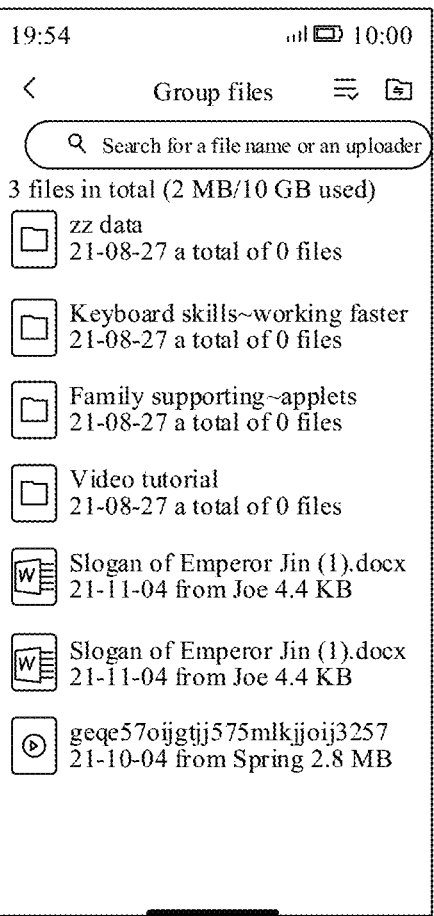

In an example, FIG. 12A to FIG. 12C are schematic diagrams showing information according to an embodiment of this application. The social network includes a plurality of types of information. FIG. 12A to FIG. 12C all show chat information in chat information interfaces. For example, FIG. 12A shows an image of a group chat session, and FIG. 12B shows an image from a group chat album. For example, FIG. 12C shows a file from group chat files. In addition, the chat information may also be displayed in the session interface in real time.

In an example, an object transmitting information is referred to as a target object below. A target object A may configure an information sharing permission for a social network, a configuration result of the information sharing permission is displayed, and the configuration result takes effect for information transmitted by the target object A. For example, the target object A configures that information transmitted to a group chat B cannot be shared, and a configuration result is recorded through a blacklist: A member object in the group chat B does not have an information sharing permission for the information transmitted by target object A to the group chat B. The configuration result has various display forms. For example, the configuration result is displayed through text. For example, the configuration result is displayed through a graphic mark.

Process 102: Display target information in response to a trigger operation by the target object for transmitting the target information.

In an example, to transmit the target information to the social network, the target information may be transmitted to a receiving object or a receiving group through the social network, or the target information may also be dynamically published through the social network. For example, the target information may be dynamically published as a mood on a personal homepage of the target object, and the target information displayed in a human-computer interaction interface of the target object. The human-computer interaction interface may be a session interface or a dynamic publishing interface.

In an example, for a scenario in which most information can be shared, and privacy protection needs to be performed on few information, for example, a proportion of information that needs privacy protection to overall information does not exceed a first proportion threshold, the first proportion threshold being obtained by performing statistical processing on data of configuring the information sharing permission by the target object within half a year or 3 months, configuration of the information sharing permission may be blacklist configuration. In a case that the configuration result represents that the target information is configured with the information sharing permission, representing that the target information is restricted from being shared, and the target information is private information that the target object A expects to protect, the target information is displayed in a first display mode. In a case that the configuration result represents that the target information is not configured with the information sharing permission, representing that the target information is not restricted from being shared, and the target information is not private information that the target object A expects to protect, the target information is displayed in a second display mode that is different from the first display mode. In this way, private information that is restricted from being shared and non-private information that is not restricted from being shared are displayed in different ways, which can improve the sense of security of a transmit end in terms of the user experience.

In an example, for a scenario in which privacy protection needs to be performed on most information, and few information can be shared, for example, a proportion of information that needs privacy protection to overall information exceeds a first proportion threshold, the first proportion threshold being obtained by performing statistical processing on data of configuring the information sharing permission by the target object within half a year or 3 months, configuration of the information sharing permission may be whitelist configuration. In a case that the configuration result represents that the target information is configured with the information sharing permission, representing that the target information is not restricted from being shared, and the target information is not private information that the target object A expects to protect, the target information is displayed in a first display mode. In a case that the configuration result represents that the target information is configured with the information sharing permission, representing that the target information is restricted from being shared, and the target information is private information that the target object A expects to protect, the target information is displayed in a second display mode that is different from the first display mode. In this way, private information that is restricted from being shared and non-private information that is not restricted from being shared are displayed in different ways, which can improve the sense of security of a transmit end in terms of the user experience.

In some embodiments, the displaying, in response to a configuration operation for an information sharing permission for the social network, a configuration result of the information sharing permission in process 101 may be achieved through the following technical solution: displaying a set time period in response to a time period setting operation for the information sharing permission; and displaying the configuration result of the information sharing permission in response to a configuration operation of updating the information sharing permission based on the time period, the configuration result recording the following information through a blacklist: an object receiving any information is prohibited from using the information sharing permission in the time period to perform a sharing operation or an operation related to the sharing operation. In this embodiment of this application, the information sharing permission is configured from the time dimension, which is equivalent to timeliness of information taking into account. After the set time period is exceeded, information is no longer restricted from being shared, and a user does not need to change the information sharing permission, which can effectively improve human-computer interaction efficiency.

In an example, the time period setting operation may be received in a system configuration interface of a social APP. For example, in a case that the set time period is the last 3 days, subsequent configuration results are all configuration results for the information sharing permission of the last 3 days. In a case that the configuration operation is for all users and information of all types, the configuration result is to prohibit all objects that have received information A transmitted by the target object within the last three days from performing a sharing operation or a sharing-related operation on the information A.

In some embodiments, the displaying, in response to a configuration operation for an information sharing permission for the social network, a configuration result of the information sharing permission in process 101 may be implemented through the following technical solution: displaying an address book interface, the address book interface including an address book of a target object, the target object being an object transmitting the target information; displaying at least one object in a selected state in response to a selection operation for the address book, the object (social account) in the selected state having a check mark correspondingly displayed; displaying, in response to a configuration operation for an information sharing permission for the at least one object, a configuration result of the information sharing permission corresponding to the at least one object in the address book, the configuration result recording the following information: the at least one object does not have the information sharing permission. The "selected state," also referred to as a "state of being selected," refers to a state in which the associated item, such as the object, is selected. In this embodiment of this application, information sharing permissions are configured in batches from the user object dimension, so that a selected user object is configured with an information sharing permission, which can effectively refine the granularity of the information sharing permission, thereby improving the effectiveness of information privacy protection.

Figure 5A:
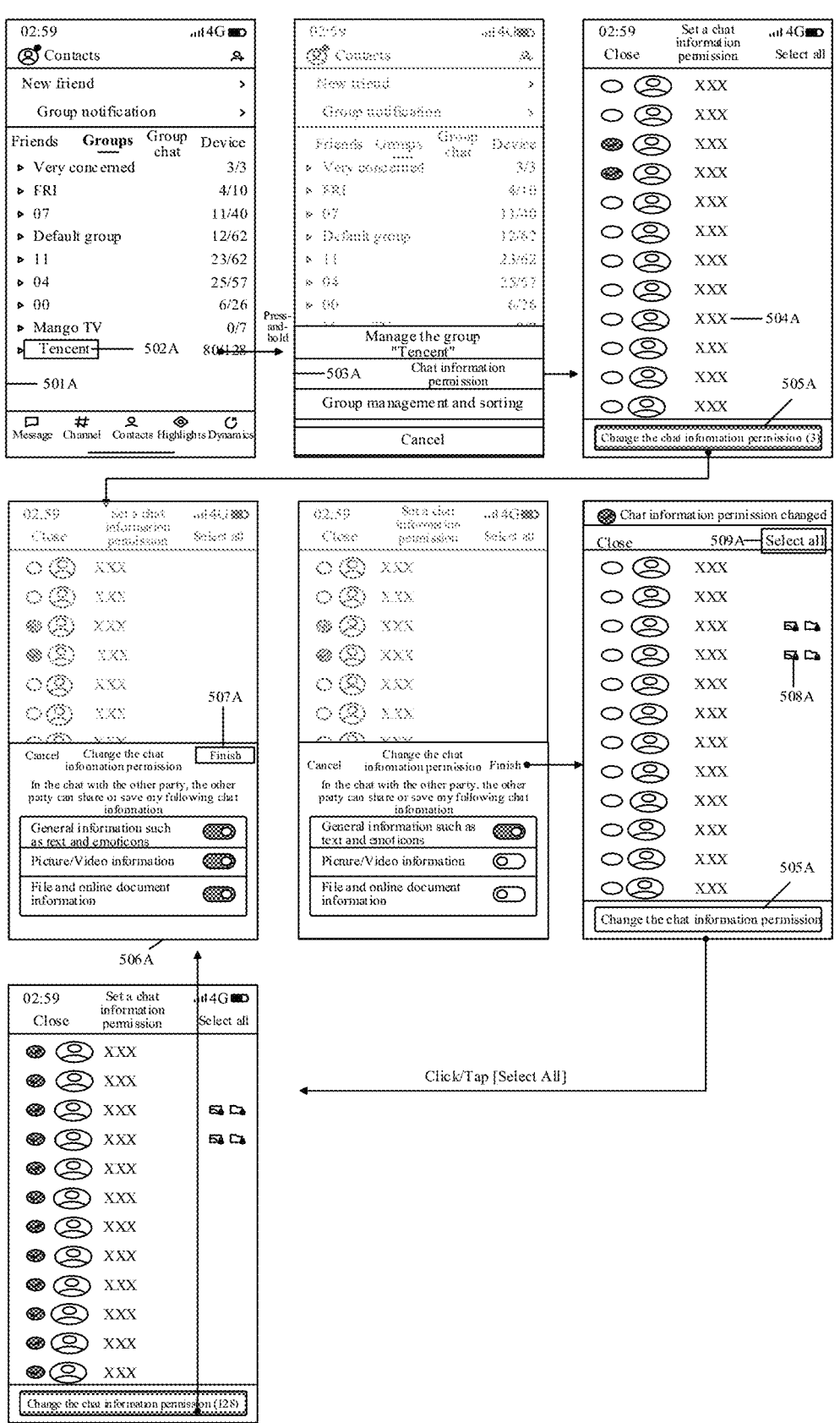
FIG. 5A to FIG. 5E are schematic diagrams showing interfaces of a privacy protection method for a social network according to an embodiment of this application.

In an example, FIG. 5A shows an address book interface 501A. The address book interface 501A includes an address book of the target object. A selection operation for the address book can be a batch selection operation. For example, after an object A and an object B are obtained through a selection operation, a configuration result herein may represent information sharing permissions of the object A and the object B, and the configuration result records, through a whitelist, that at least one object (the object A and the object B) has an information sharing permission for at least partial information transmitted by the target object to the social network or the configuration result records, through a blacklist, the following information: at least one object (the object A and the object B) does not have an information sharing permission for at least partial information transmitted by the target object to the social network, the at least partial information may be all information transmitted by the target object to the social network, or partial information transmitted by the target object to the social network (for example, information of some types).

In some embodiments, the displaying a configuration result of the information sharing permission corresponding to the at least one object in the address book may be implemented through the following technical solution: performing the following processing on each object: displaying an information type identifier of each information type in a region corresponding to the object in the address book, to represent that the object does not have the information sharing permission for all information types.

In an example, the following processing is performed respectively for the foregoing object A and the foregoing object B: displaying an information type identifier of each information type in a region corresponding to the object A in the address book and in a region corresponding to the object B in the address book, to represent that an object does not have the information sharing permission for all information types. For example, there are three information types, namely, "Text and emoticon general information type," "Picture/video information type," and "File and online document information type." The three information types all correspond to their own information type identifiers, and the information type identifiers all have a lock pattern, to represent that the object A and the object B do not have an information sharing permission for information of the information types. For example, the target object transmits text information to the object A, and after receiving the text information, the object A cannot share the text information.

In some embodiments, the displaying, in response to a configuration operation for an information sharing permission for the at least one object, a configuration result of the information sharing permission corresponding to the at least one object in the address book in process 101 may be implemented through the following technical solution: displaying a permission switch control, the permission switch control including permission switches respectively corresponding to a plurality of information types; and performing the following processing on each object in the at least one object in response to a configuration operation of switching off a permission switch corresponding to a first information type, the first information type being any information type in the plurality of information types: displaying an information type identifier of the first information type in a region corresponding to the object in the address book, to represent that the object does not have the information sharing permission for the first information type. In this embodiment of this application, an information sharing permission is configured from the user object dimension, so that an information sharing permission is configured based on an information type for user objects selected in batches, which further refines the granularity of the information sharing permission, thereby improving the effectiveness of information privacy protection.

In an example, the permission switch is indicated by 506A in FIG. 5A. In response to a configuration operation of switching off a permission switch of "File and online document information type," an information type identifier of "File and online document information type" is displayed in the regions corresponding to the object A and the object B in the address book, and the information type identifier has a lock pattern, which represents that the object A and the object B do not have an information sharing permission for information belonging to "File and online document information type." For example, the target object transmits an online document to the object A, and after receiving the online document, the object A cannot share the online document.

In some embodiments, the address book includes at least one of the following lists: an object list, an object group list, and a group chat group list. The object list includes a plurality of candidate objects. The object group list includes a plurality of candidate object groups. The group chat group list includes a plurality of candidate group chat groups, for example, "a created group chat" and "a managed group chat." Referring to FIG. 5A and FIG. 5B, an object group list is displayed in the address book interface 501A, and a group chat group list is displayed in an address book interface 501B.

In some embodiments, the displaying at least one object in a selected state in response to a selection operation for the address book may be implemented through the following technical solution: displaying the at least one object in the selected state in response to a selection operation for the object list, which is equivalent to directly selecting, from a plurality of candidate objects included in the object list, an object that requires configuration, for example, selecting an object A that requires configuration. By selecting, from the list, the object that requires configuration, a user can be provided with a full selection function, thereby ensuring that the information permission configuration satisfying user requirements is implementation.

In some embodiments, the displaying at least one object in a selected state in response to a selection operation for the address book may be implemented through the following technical solution: displaying, in response to a viewing operation for a first object group in the object group list, a plurality of objects included in the first object group, the first object group being any object group in the object group list, and displaying, in response to a selection operation for at least one object included in the first object group, the at least one object in a selected state. By selecting, in the object group list, the object that requires configuration, the efficiency of selecting an object by a user can be improved, and the object can be selected in a targeted manner, thereby improving the human-computer interaction efficiency.

In an example, referring to FIG. 5A, in response to a trigger operation for an object group 502A (the first object group), a pop-up window including a chat information permission entry 503A is displayed, in response to a trigger operation for the chat information permission entry 503A, a plurality of objects 504A included in the first object group are displayed, and in response to a selection operation for at least one object 504A included in the first object group, the at least one object in a selected state is displayed, and the object in the selected state may be displayed with a check mark.

In some embodiments, the displaying at least one object in a selected state in response to a selection operation for the address book may be implemented through the following technical solution: displaying, in response to a viewing operation for a first group chat group in the group chat group list, a plurality of group chats included in the first group chat group, the first group chat group being any group chat group in the group chat group list, and displaying, in response to a selection operation for at least one group chat included in the first group chat group, the at least one group chat in a selected state, each group chat including a plurality of objects.

In an example, referring to FIG. 5A, in response to a trigger operation for a group chat group 502B (the first group chat group), a pop-up window including a chat information permission entry 503B is displayed, in response to a trigger operation for the chat information permission entry 503B, a plurality of group chats 504B included in the first group chat group are displayed, and in response to a selection operation for at least one group chat 504B included in the first group chat group, the at least one group chat in a selected state is displayed, a check mark may be displayed for the group chat in the selected state, and each group chat includes a plurality of objects, so that objects included in the selected group chat are in a selected state.

Through this embodiment of this application, diversified selection is performed on user objects, to provide a user with diverse object selection methods, thereby improving the convenience of user object selection for different requirements, and improving the human-computer interaction efficiency.

In some embodiments, an effect-taking moment of the information sharing permission includes at least one of the following: a change moment, the change moment being a moment at which the information sharing permission is generated or updated according to the configuration operation (equivalent to that the configuration result of the information sharing permission obtained through the configuration operation takes effect once the configuration operation is completed); and a specified moment, the specified moment being a moment configured to be later than the change moment (equivalent to taking effect in a delayed manner, for example, taking affect 10 minutes after the configuration operation is completed).

In an example, an effective time period of the information sharing permission starts from the effect-taking moment of the information sharing permission and ends at a target moment. A time interval between the target moment and the effect-taking moment is a specified time interval, or the target moment is a moment at which the information sharing permission is changed next time. Taking effect in a delayed manner provides a user with a buffer time, so that in a case that the user configures the information sharing permission incorrectly, correction can be performed in time.

In some embodiments, the displaying, in response to a configuration operation for an information sharing permission for the social network, a configuration result of the information sharing permission may be implemented through the following technical solution: displaying a setting interface of a social object, the setting interface of the social object including a dimension for configuring the information sharing permission, and the social object being any object having a social relationship with a target object of the target information, the dimension including at least one of the following: an information type and a time period; and displaying, in response to a configuration operation based on at least one dimension, a configuration result of the information sharing permission corresponding to the at least one dimension, the configuration result recording at least one of the following information: the social object does not have the information sharing permission for the information type; and the social object is prohibited from using the information sharing permission in the time period.

In an example, the configuration result records through a whitelist: The social object has the information sharing permission for the information type; and the social object is allowed to use the information sharing permission in the time period. Alternatively, the configuration result records at least one of the following information through a blacklist: The social object does not have the information sharing permission for the information type; and the social object is prohibited from using the information sharing permission in the time period. Because generally, the information sharing permission needs to be restricted in few cases, recording is usually performed by using a blacklist, and it is only necessary to record the configuration result that the social object does not have information sharing permission. The information sharing permission may be configured directly for a specific social object, so that the configuration of the information sharing permission is targeted, which improves the configuration efficiency.

Figure 5B:
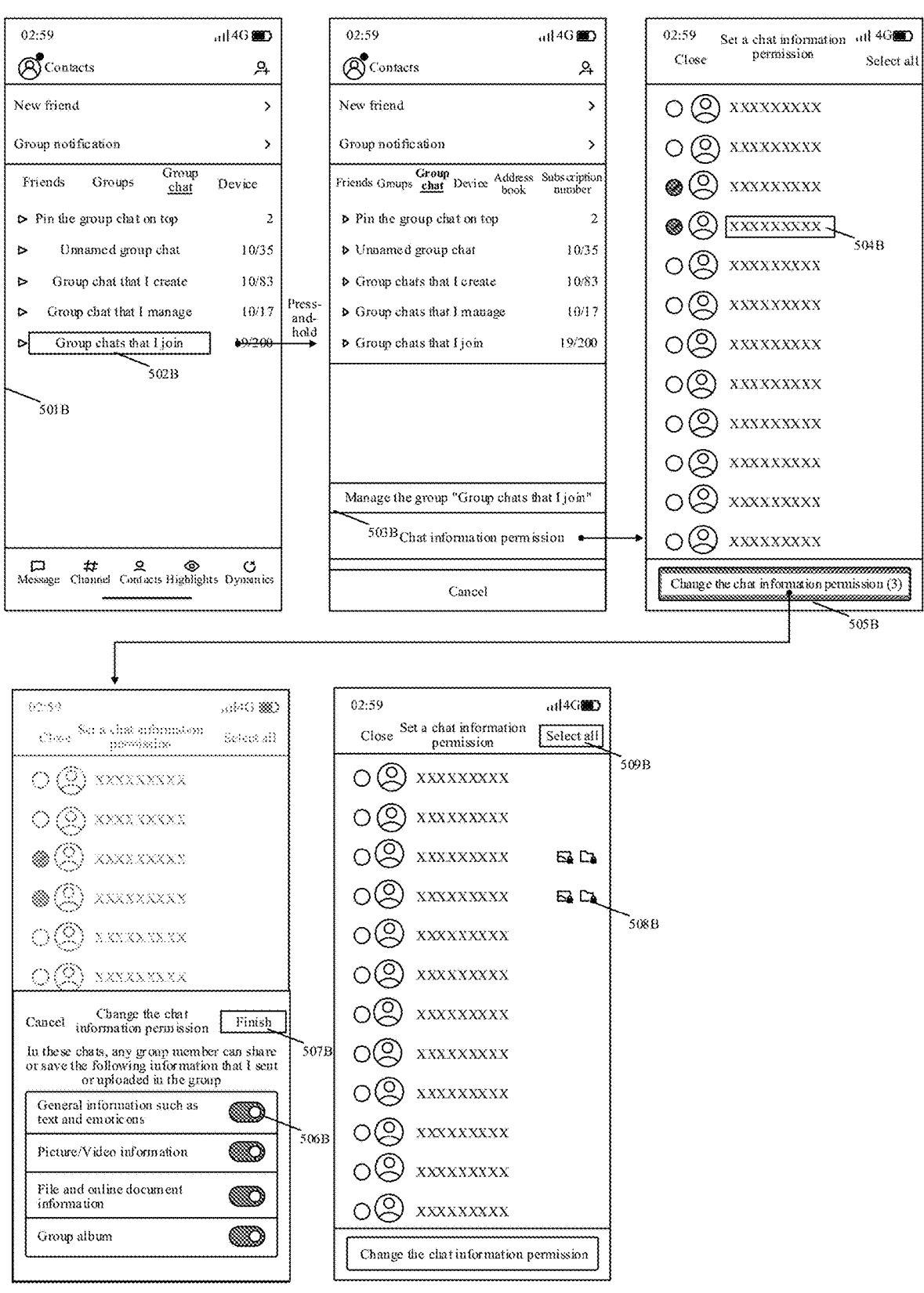
Figure 5C:
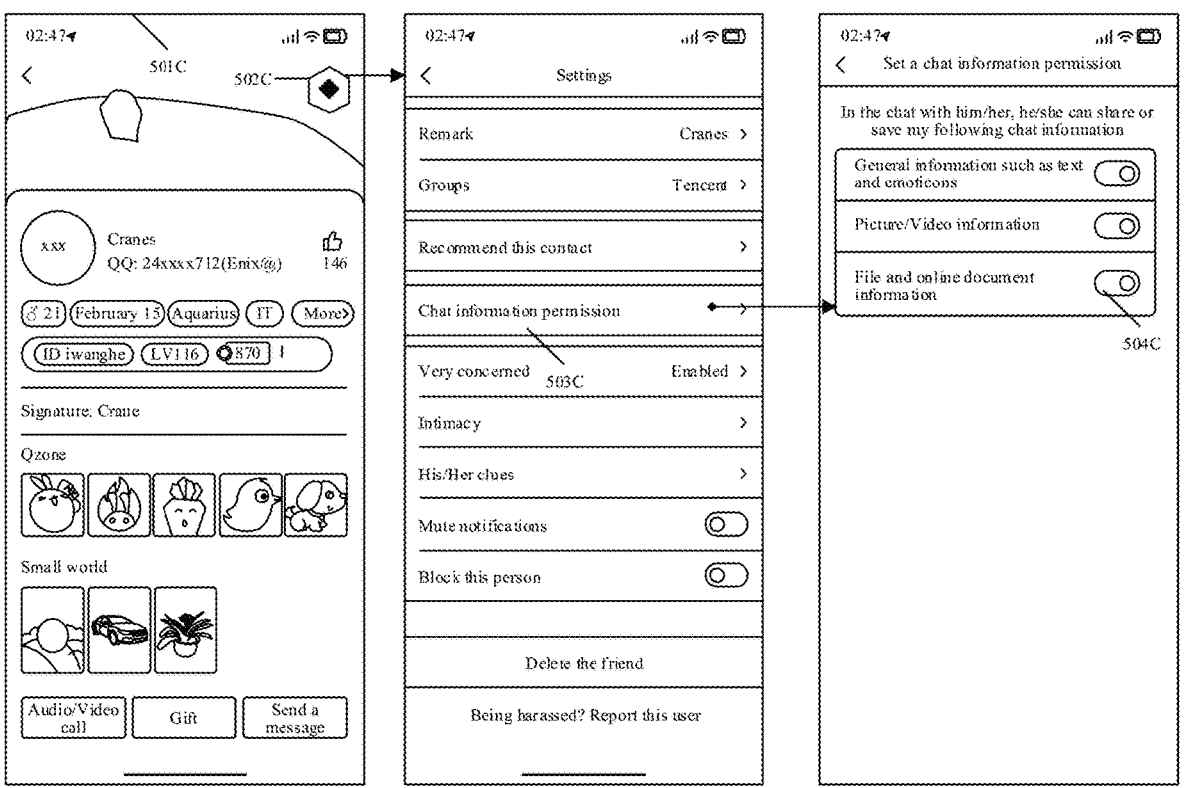

In an example, FIG. 5C shows a setting interface 501C of a social object. The social object is pre-selected. For example, after a social object A is directly selected through the address book, display of a data card of the social object A is triggered. A setting entry 502C is displayed in the data card. In response to a trigger operation for the setting entry 502C, a setting interface of the social object A is displayed. A chat information permission entry 503C is included in the setting interface. In response to a trigger operation for the chat information permission entry 503C, an information type is displayed in the setting interface (the information type is one of the dimensions used for configuring the information sharing permission)

In some embodiments, in a case that the dimension is the information type, the displaying, in response to a configuration operation based on at least one dimension, a configuration result of the information sharing permission corresponding to the at least one dimension may be implemented through the following technical solution: displaying a permission switch control, the permission switch control including permission switches respectively corresponding to a plurality of information types; and displaying, in response to a configuration operation of switching off a permission switch corresponding to a first information type, the first information type being any information type in the plurality of information types, an information type identifier of the first information type in the setting interface of the social object, to represent that the social object does not have the information sharing permission for the first information type. For a specific social object, the social object is configured with information sharing permissions for information of different types, which further refines the granularity of the information sharing permission, thereby improving the effectiveness of information privacy protection.

In an example, FIG. 5C shows permission switches 504C corresponding to a plurality of information types. In response to receiving a configuration operation of switching off a permission switch of "File and online document information type," an information type identifier of "File and online document information type" is displayed in the setting interface of the social object A, and the information type identifier has a lock pattern, which represents that the social object A does not have an information sharing permission for information transmitted by the target object and belonging to "File and online document information type."

In some embodiments, in a case that the dimension is the time period, the displaying, in response to a configuration operation based on at least one dimension, a configuration result of the information sharing permission corresponding to the at least one dimension may be implemented through the following technical solution: displaying a permission switch control, the permission switch control including permission switches respectively corresponding to a plurality of time periods; and displaying, in response to a configuration operation of switching off a permission switch corresponding to a first time period, a time period identifier of the first time period in the setting interface of the social object, to represent that the social object does not have an information sharing permission in the first time period. For a specific social object, the social object is configured with information sharing permissions for different time periods, which further refines the granularity of the information sharing permission, thereby improving the effectiveness of information privacy protection.

In an example, a plurality of time periods and permission switches corresponding to all the time periods are displayed. The time periods may be "Last three days," "Last month," "Last three months," and the like. The first time period is any time period in the plurality of time periods. For example, in response to receiving a configuration operation of switching off a permission switch of "Last three days," a first time period identifier of "Last three days" is displayed in the setting interface of the social object A, and the first time period identifier has a lock pattern, to represent that the social object A does not have an information sharing permission in the last three days for information transmitted by the target object.

In some embodiments, the displaying, in response to a configuration operation for an information sharing permission for the social network, a configuration result of the information sharing permission in process 101 includes: displaying a setting interface of a social group to which a target object belongs, the target object being an object transmitting the target information, the setting interface of the social group including a dimension for configuring the information sharing permission, the dimension including at least one of the following: an information type, an identity, and a time period; and displaying, in response to a configuration operation based on at least one dimension, a configuration result of the information sharing permission corresponding to the at least one dimension, the configuration result recording at least one of the following information through a blacklist: the information type for which use of the information sharing permission is prohibited; another object in the social group other than the target object is prohibited from using the information sharing permission in the time period; and an object having the identity in the social group is prohibited from using the information sharing permission. For a specific social group, an information sharing permission for the social group may be configured, so that the configuration of the information sharing permission is targeted, which improves the configuration efficiency.

In an example, the social group is pre-selected. For example, after a social group A is selected directly through the address book, a setting interface of the social group A is triggered. The setting interface includes a chat information permission entry 501D. In response to a trigger operation for the chat information permission entry 501D, a dimension for configuring the information sharing permission is displayed and included. For example, using an example in which the dimension is only the information type, the information type is displayed in the setting interface of the social group, and the information type is one of the dimensions for configuring the information sharing permission. Using an example in which the dimension only the information type, an information type identifier of "File and online document information type" is displayed in the setting interface of the social group A, and the information type identifier has a lock pattern, to represent an object in the social group A other than the target object does not have an information sharing permission for information transmitted by the target object in the social group A and belonging to "File and online document information type."

In some embodiments, in a case that the dimension is the identity, the displaying, in response to a configuration operation based on at least one dimension, a configuration result of the information sharing permission corresponding to the at least one dimension may be implemented through the following technical solution: displaying a permission switch control, the permission switch control including permission switches respectively corresponding to a plurality of identities; and displaying, in response to a configuration operation of switching off a permission switch corresponding to a first identity, the first identity being any identity in the plurality of identities, an identity identifier of the first identity in the setting interface of the social group, to represent that an object of the first identity does not have the information sharing permission. For a specific social group, the social group is configured with information sharing permissions for members with different identities, which further refines the granularity of the information sharing permission, thereby improving the effectiveness of information privacy protection.

In an example, a plurality of identities and permission switches corresponding to all the identities are displayed. The identities may be "Group owner," "Administrator," "Member," and the like. In response to receiving a configuration operation of switching off a permission switch of "Member," a first identity identifier of "Member" is displayed in the setting interface of the social group A, and the first identity identifier has a lock pattern, to represent that an object whose identity is "Member" in the social group A does not have an information sharing permission for information transmitted by the target object in the social group A.

In some embodiments, the displaying, in response to a configuration operation for an information sharing permission for the social network, a configuration result of the information sharing permission may be implemented through the following technical solution: displaying a configuration interface of the information sharing permission, the configuration interface including configuration entries respectively corresponding to a plurality of information types; displaying an object addition interface in response to a trigger operation for a configuration entry of a second information type, the second information type being any information type in the plurality of information types, the object addition interface including an object set, the object set being an empty set or a non-empty set, an object in the object set not having the information sharing permission for the second information type; adding the at least one object to the object set corresponding to the second information type in response to a configuration operation of adding the at least one object to the object set; and displaying an information type identifier of the second information type in a region corresponding to each object in the object set, to represent that an object in the object set does not have the information sharing permission for the second information type. In this embodiment of this application, corresponding user objects not granted with an information sharing permission are directly added for different information types, thereby improving the effectiveness of information privacy protection.

Figure 5D:
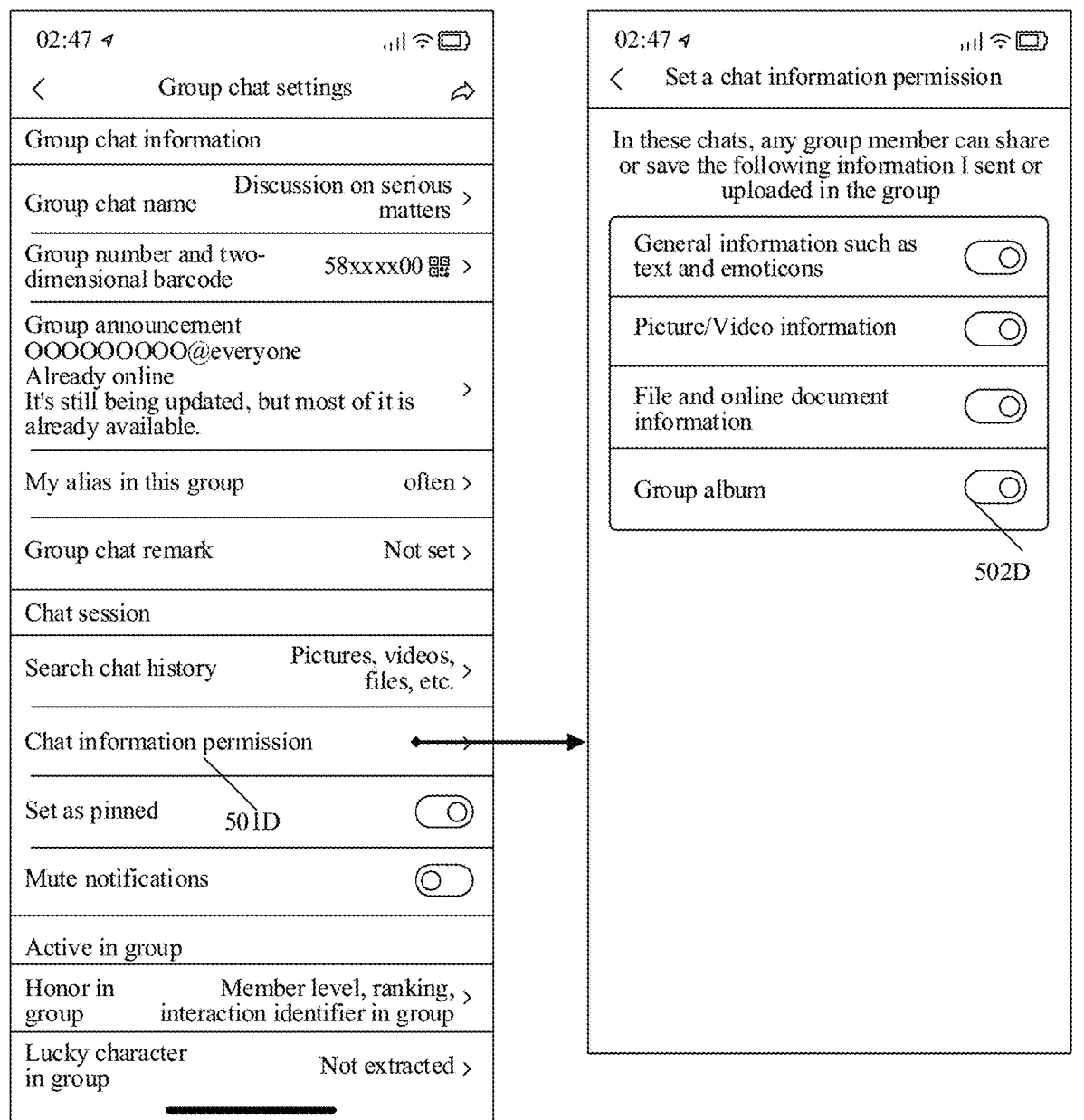
Figure 5E:
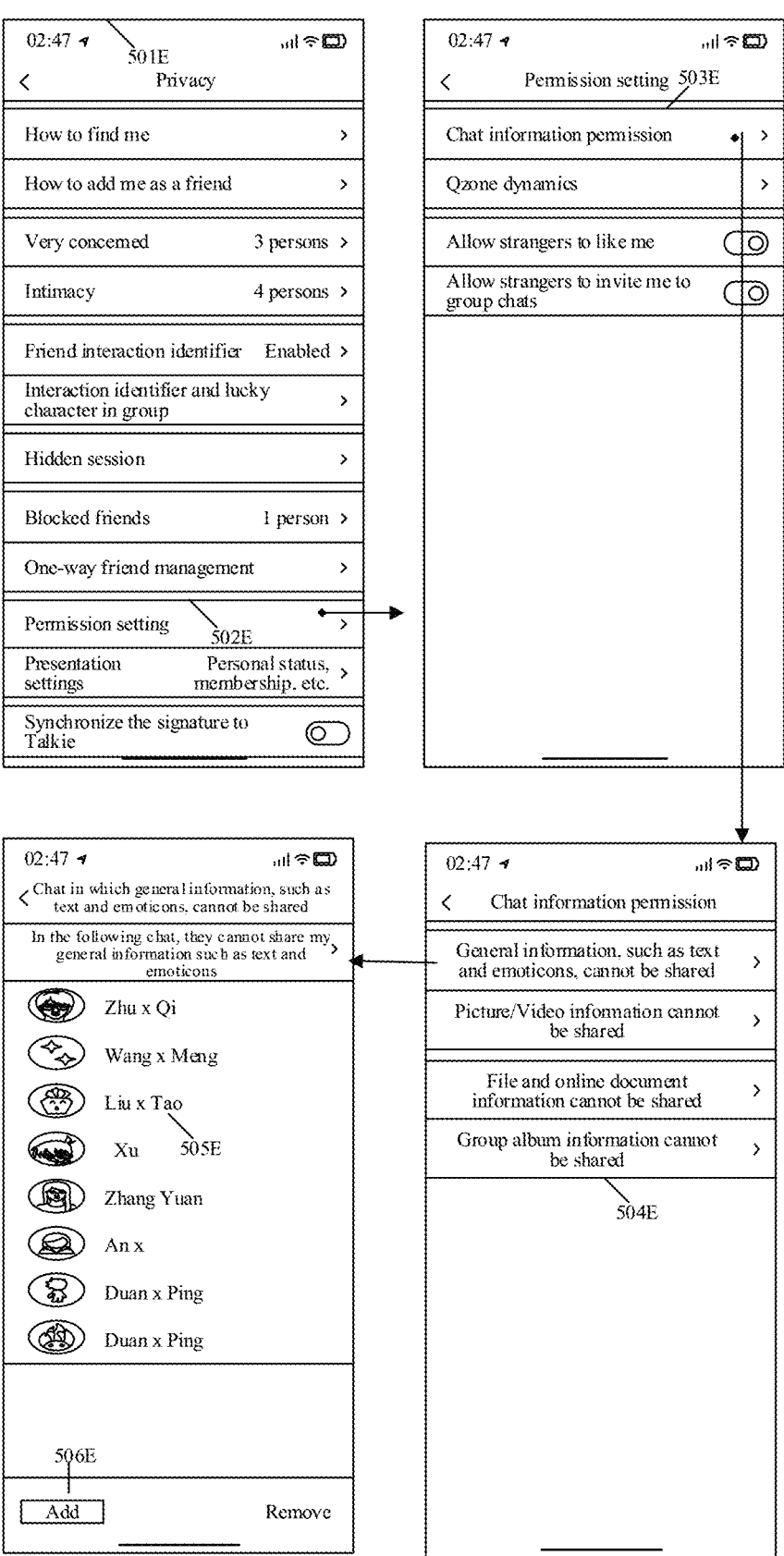

In an example, FIG. 5E is a schematic diagram showing interfaces of a privacy protection method for a social network according to an embodiment of this application. An information sharing permission configuration interface may be a system privacy setting interface 501E. The system privacy setting interface 501E displays a permission setting entry 502E. In response to a trigger operation for the permission setting entry 502E, a chat information permission setting entry 503E is displayed. In response to a trigger operation for the chat information permission setting entry 503E, the system privacy setting interface 501E displays configuration entries 504E for different types of chat information. For example, in response to a trigger operation for the configuration entry 504E for "File and online document information type," an object addition interface is displayed. In response to a trigger operation for an addition control 506E, candidate objects are displayed. In response to a selection operation for a candidate object (which may be recognized as an object addition configuration operation), the selected object may be determined as an object that cannot share information of "File and online document information type," and added to the object set for display. In a session interface of the target object and an object A, an information type identifier of the second information type is displayed near an avatar of the object A, to represent that the object A in the object set does not have an information sharing permission for "File and online document information type."

There are configuration solutions for information sharing permissions in a plurality of dimensions in the privacy protection method for a social network provided in this embodiment of this application, which are not limited to the configuration methods described in the foregoing embodiments. The configuration dimensions include an object, an information type, and a time period. Configuration may be performed based on a single dimension: Configuration may be performed only for any one of the object, the information type, and the time period. For example, a specific object A cannot share, at any time, information of any information type transmitted by a target object B. For example, none of receiving objects can share, at any time, information of an image type transmitted by the target object B. For example, none of receiving objects can share, in the last three days, any information transmitted by the target object B. Configuration may be performed based on two dimensions, and a configuration order of the two dimensions may not be limited, for example, configuration may be performed based on the object and the information type, configuration may be performed based on the object and the time period, configuration may be performed based on the information type and the time period, and the like. In a case that configuration is performed based on two dimensions, an object may be selected first, for example, an object A is selected, and a time period is set to the last three days. In this case, the receiving object A cannot share, in the last three days, any information transmitted by a target object B. Configuration may also be performed based on three dimensions, and a configuration order of the three dimensions may not be limited Therefore, there are a plurality of configuration methods in the privacy protection method for a social network provided in this embodiment of this application, to adapt to various configuration scenarios.

FIG. 4B is a schematic flowchart of a privacy protection method for a social network according to an embodiment of this application. Descriptions are provided with reference to the processes shown in FIG. 4B.

Process 201: Receive target information from a social network.

Process 202: Display, in response to that a receiving object does not have an information sharing permission for the target information, the target information in a first display mode in a human-computer interaction interface of the receiving object.

In an example, the first display mode is different from a second display mode, the second display mode being a display mode adopted in response to that the receiving object has the information sharing permission for the target information.

In an example, for information whose sharing permission needs to be restricted, a privacy icon corresponding to the target information is displayed in a human-computer interaction interface of the receiving object, to represent that the target information is configured with the information sharing permission. For information whose sharing permission does not need to be restricted, no privacy icon is displayed, to represent that the target information is not configured with the information sharing permission.

In an example, for information whose sharing permission needs to be restricted, a privacy icon corresponding to the information is displayed, to represent that the information is configured with the information sharing permission. For information whose sharing permission does not need to be restricted, a sharing icon corresponding to the information is displayed. The privacy icon is different from the sharing icon in style. For example, the privacy icon is different from the sharing icon in at least one of the following: a color, a size, text, and an image.

In an example, for information whose information sharing permission does not need to be restricted, a sharing icon corresponding to the information may also be displayed, to represent that any object has an information sharing permission for the information. For information whose sharing permission needs to be restricted, a privacy icon corresponding to the information is displayed, to represent that the information is configured with the information sharing permission.

In some embodiments, the displaying the target information in a first display mode in a human-computer interaction interface of the receiving object in process 202 may be implemented through the following technical solution: performing any one of the following processing: displaying the target information and a privacy icon corresponding to the target information in the human-computer interaction interface, the privacy icon representing that the receiving object is configured not to have the information sharing permission for the target information; and displaying the target information in the human-computer interaction interface, content in the target information being subjected to privacy protection processing, the privacy protection processing including any one of the following: mosaic addition, blurring, and occlusion superimposition. The target information is displayed by displaying a privacy icon or through privacy protection processing, so that the target information may be displayed in a distinguished manner, and the receiving object is prompted that the target information cannot be shared, to prevent the receiving object from initiating a sharing operation and improve the human-computer interaction efficiency.

In an example, the privacy icon may be a lock pattern. The privacy icon may be displayed on the target information, or the privacy icon may be displayed near the target information. In a case that the target information is an image and text, mosaic addition, blurring, or occlusion superimposition may be performed on the target information. In a case that the target information is a document, occlusion superimposition is performed on content of the document.

The solution of displaying the target information in the first display mode and related implementations provided in this embodiment of this application are also applicable to a transmitting party. That is, on a terminal of the transmitting party, in response to a trigger operation for transmitting the target information, the target information is displayed in the first display mode in a human-computer interaction interface of a transmitting object.

In some embodiments, after the displaying the target information in a first display mode in a human-computer interaction interface of the receiving object method, any one of the following processing is performed in a case that content in the target information is subjected to privacy protection processing to display original content of the target information: loading, in response to a preview trigger operation for the target information, a floating layer in a first sub-interface configured to display the target information in the human-computer interaction interface, the floating layer including content that has not been subjected to the privacy protection processing in the target information; hiding the floating layer in response to that a duration of displaying the floating layer reaches a duration threshold or the preview trigger operation is released; and switching, in response to a details trigger operation for the target information, the first sub-interface configured to display the target information in the human-computer interaction interface to a second sub-interface, the second sub-interface including the target information, the content in the target information having not been subjected to the privacy protection processing. The second sub-interface is an interface independent of the first sub-interface. For example, the second sub-interface is a details interface. Displaying the target information through privacy protection processing can improve the effectiveness of information privacy security protection. Target information that has not been subjected to privacy protection processing can be displayed in a preview manner or in a manner of switching to another interface for viewing, which improves human-computer interaction diversity.

In an example, in response to a press-and-hold operation (identified as a preview trigger operation) for the target information, a floating layer is loaded in a first sub-interface configured to display the target information in a session interface or an information viewing interface. The first sub-interface is an interface displaying the target information in the session interface or the information viewing interface. The floating layer includes content that has not been subjected to privacy protection processing in the target information, for example, an image that has not been subjected to mosaic processing. In response to that a duration of displaying the floating layer reaches a duration threshold or the preview trigger operation is released, the floating layer is hidden. For example, in a case that the press-and-hold operation is released, or a duration that the press-and-hold operation has lasted exceeds a duration threshold, the float- ing layer is hidden, and only target information that has been subjected to privacy protection processing is displayed.

Related implementations for the target information pro- vided in this embodiment of this application are also appli- cable to a transmitting party. That is, on a terminal of the transmitting party, after the target information is displayed in the first display mode in a human-computer interaction interface of a transmitting object, in a case that content in the target information is subjected to privacy protection pro- cessing, any one of the following processing is performed to display original content of the target information.

In some embodiments, the displaying the target informa- tion in a first display mode in a human-computer interaction interface of the receiving object in process 202 may be implemented through the following technical solution: dis- playing an information card including the target informa- tion, the information card satisfying at least one of the following conditions: a style of the information card is different from a style of an information card displayed based on the second display mode; and a style of the target information in the information card displayed based on the first display mode is different from a style of the target information in the information card displayed based on the second display mode. The display mode is distinguished based on the information card, to display the target infor- mation. The receiving object is prompted that the target information cannot be shared, to prevent the receiving object from initiating a sharing operation and improve the human- computer interaction efficiency.

In an example, an information card of non-private infor- mation (information that is not restricted from being shared) has a green background, and the information card of the target information has a white background. Alternatively, a style of the target information in the information card in the first display mode is bold, and the non-private information is in Song font in the information card.

The solution of displaying the target information in the first display mode and related implementations provided in this embodiment of this application are also applicable to a transmitting party. That is, on a terminal of the transmitting party, in response to a trigger operation for transmitting the target information, the target information is displayed in the first display mode in a human-computer interaction interface of a transmitting object.

In some embodiments, after the displaying the target information in a first display mode in a human-computer interaction interface of the receiving object, at least one of the following processing is performed: displaying prompt information, the prompt information being configured to prompt that the receiving object does not have the informa- tion sharing permission for the target information; and blocking execution of an operation for the target informa- tion, the operation requiring use of the information sharing permission. Through this embodiment of this application, the receiving object may be prevented from triggering an operation that may be blocked, thereby improving the human-computer interaction efficiency and protecting the privacy security of the target information from the root.

In an example, the operation is essentially a sensitive operation for the target information. The sensitive operation includes at least one of the following: an information sharing operation and an operation related to the information sharing operation. All the operations require use of the information sharing permission, for example, a saving operation, an add-to-favorites operation, and a screenshot operation. Execution of an operation for the target information may be locked in two blocking manners: One is to block display of a related control to not provide the receiving object with an opportunity to perform a sensitive operation, and the other is to receive a sensitive operation, but refuse to respond to the sensitive operation for the target information.

In some embodiments, the blocking execution of an operation for the target information may be implemented through the following technical solution: displaying a ses- sion interface, the session interface including a plurality of pieces of information, private information in the plurality of pieces of information being displayed in a gray state, the private information being session information for which the receiving object does not have the information sharing permission; displaying at least one piece of information in a selected state in response to a selection operation in the session interface, the at least one piece of information including the target information; and blocking display of a functional control related to the information sharing permis- sion in a case that the receiving object does not have the information sharing permission for any one of the at least one piece of information, representing that the receiving object does not have the information sharing permission for any of the at least one piece of information, to block a sensitive operation. For example, all sharing and saving controls are in a non-triggerable state, for example, a for- warding control 709A in a gray state. A manner of the blocking display includes at least one of the following: hiding the display (equivalent to not displaying) and per- forming the display in a non-triggerable state (for example, display in a gray state). The sensitive operation includes at least one of the following: an information sharing operation and an operation related to the information sharing opera- tion. The sensitive operation requires use of the information sharing permission. The sensitive operation for the target information is actively blocked by hiding the control, which can prevent the receiving object from initiating a sensitive operation and improve the human-computer interaction effi- ciency.

Figure 7A:
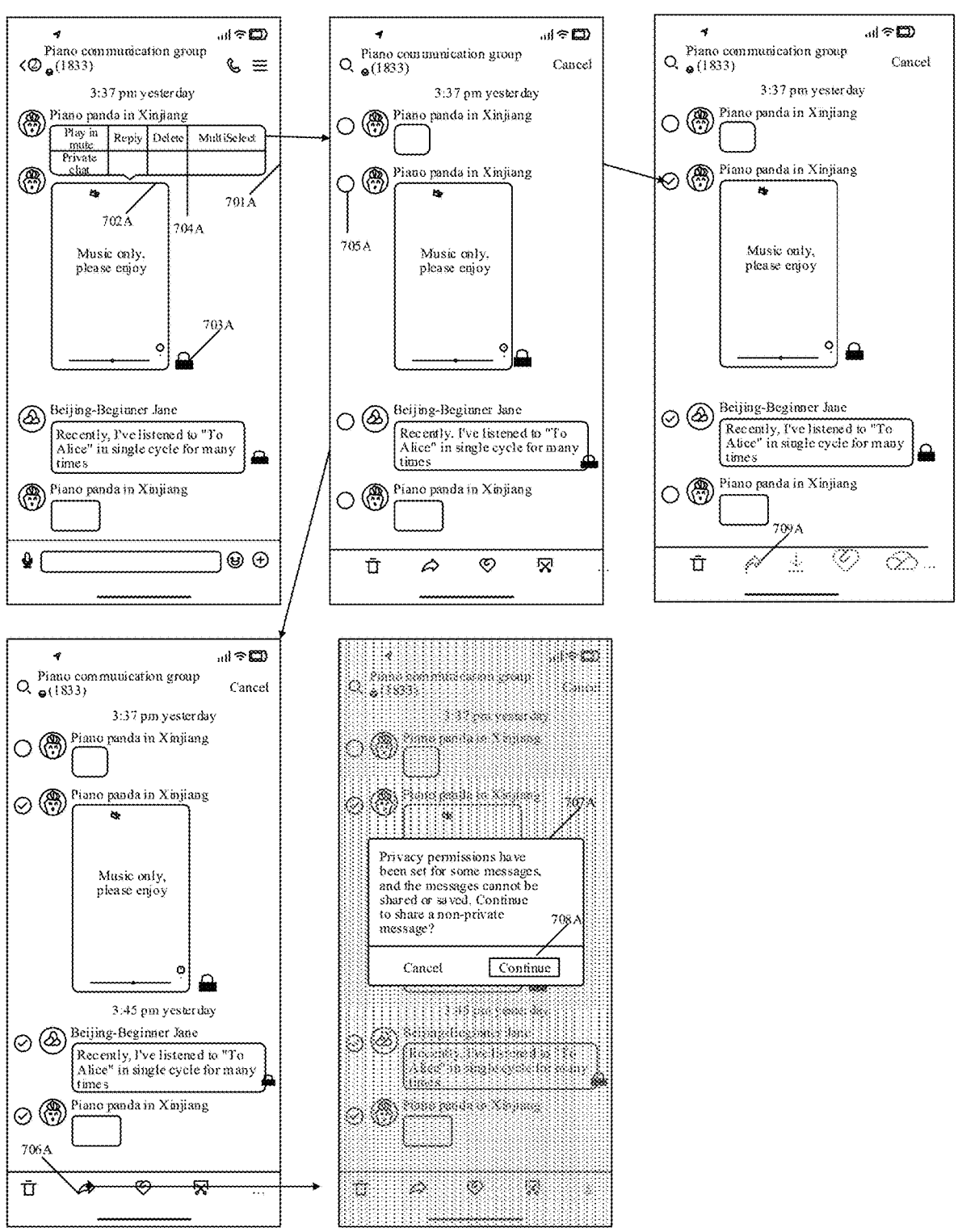
FIG. 7A to FIG. 7F are schematic diagrams showing interfaces of a privacy protection method for a social network according to an embodiment of this application.

In an example, referring to FIG. 7A, video information 702A and a privacy icon 703A are displayed in a session interface 701A. In response to a trigger operation for the video information 702A, an operation panel 704A for the video information 702A is displayed. The operation panel 704A does not include any control related to saving and sharing. In response to a trigger operation for a multi-select functional control in the operation panel 704A, a check box 705A for each piece of information is displayed in the session interface 701A.

In some embodiments, the blocking execution of an operation for the target information may be implemented through the following technical solution: displaying a ses- sion interface, the session interface including a plurality of pieces of information, private information in the plurality of pieces of information being displayed in a gray state, the private information being session information for which the receiving object does not have the information sharing permission; displaying at least one piece of information in a selected state in response to a selection operation in the session interface, the at least one piece of information including the target information; and performing privacy protection processing on content in the private information in response to a sensitive operation for the at least one piece of information, the sensitive operation including at least one of an information sharing operation and an operation related to the information sharing operation, the privacy protection processing including at least one of the following: deleting, in a case that the private information is text, a keyword related to privacy from the text (the text may be the text in a text message, or the text may be text in a document, and for example, in a case that a company name is privacy, the company name is deleted from the text); performing, in a case that the private information is an image, at least one of the following processing on content related to privacy in the image: mosaic processing, blurring, and occlusion addition processing (for example, in a case that the image includes a face that cannot be made public and belongs to privacy, mosaic processing is performed on the face part); and silencing, in a case that the private information is audio, a part related to privacy in the audio (for example, in a case some audio frames in the audio involve private content, these audio frames are silenced). Through the privacy protection processing, in a case that the target information has been shared, private content of the target information can still be protected, which builds the last line of defense for information privacy protection and effectively improves the effectiveness of information privacy security protection.

In an example, referring to FIG. 7A, video information 702A and a privacy icon 703A are displayed in a session interface 701A. In response to a trigger operation for the video information 702A, an operation panel 704A for the video information 702A is displayed. The operation panel 704A does not include any control related to saving and sharing. In response to a trigger operation for a multi-select functional control in the operation panel 704A, a check box 705A for each piece of information is displayed in the session interface 701A.

In some embodiments, the displaying prompt information may be implemented through the following technical solution: displaying a session interface, the session interface including a plurality of pieces of information, private information in the plurality of pieces of information being displayed in a gray state, the private information being session information for which the receiving object does not have the information sharing permission; displaying at least one piece of information in a selected state in response to a selection operation in the session interface, the at least one piece of information including the target information; and displaying the prompt information in response to a sensitive operation for the at least one piece of information, the sensitive operation including at least one of an information sharing operation and an operation related to the information sharing operation. Visual interaction may be performed with the receiving object by displaying the prompt information, which improves the user experience of the receiving object.

In an example, referring to FIG. 7A, video information 702A and a privacy icon 703A are displayed in a session interface 701A. In response to a trigger operation for the video information 702A, an operation panel 704A for the video information 702A is displayed. The operation panel 704A does not include any control related to saving and sharing. In response to a trigger operation for a multi-select functional control, a check box 705A for each piece of information is displayed in the session interface 701A. In response to a selection operation for information, a check mark is displayed in the check box 705A corresponding to the information. For example, all pieces of selected information have a privacy icon, or some pieces of selected information have a privacy icon. In a case that all pieces of selected information have a privacy icon, all sharing and saving controls are in a non-triggerable state, for example, a forwarding control 709A in a gray state. In a case that some pieces of selected information have a privacy icon, prompt information is displayed during sharing, to prompt that private information may not be shared.

In some embodiments, the displaying prompt information may be implemented through the following technical solution: displaying first prompt information in response to that the receiving object does not have the information sharing permission for any one of the at least one piece of information, the first prompt information being configured to prompt that the receiving object does not have the information sharing permission for any one of the at least one piece of information; and displaying second prompt information in response to that the at least one piece of information is a plurality of pieces of information, and the receiving object does not have the information sharing permission for some pieces of information in the at least one piece of information, the second prompt information being configured to prompt that the receiving object does not have the information sharing permission for the some pieces of information. Through this embodiment of this application, the privacy security of some pieces of information in batch information can be flexibly controlled, to ensure normal transmitting and receiving of information while protecting the privacy, which improves the communication resource utilization.

In an example, in a case that the receiving object does not have an information sharing permission for any piece of selected information, the first prompt information is displayed to inform the receiving object that the receiving object does not have an information sharing permission for any piece of selected information. In a case that the receiving object does not have an information sharing permission for some pieces of selected information, the second prompt information is displayed to inform the receiving object that the receiving object does not have an information sharing permission for some pieces of information included in the selected information.

In some embodiments, in a case that the second prompt information is displayed, a continue-to-share control is displayed. Non-private information is transmitted to the social network in response to a trigger operation for the continue-to-share control, the non-private information being information for which the receiving object have the information sharing permission in the at least one piece of information. Through a continuous forwarding function, continuous forwarding of the non-private information can be achieved, to prevent the receiving object from re-selecting information, which improves the human-computer interaction efficiency.

In an example, in response to a trigger operation for a forwarding control 706A, prompt information 707A (second prompt information) and a continuous forwarding control 708A are displayed. The second prompt information is configured to inform a user that a sharing permission is set for some pieces of information and the pieces of information cannot be shared or saved, and whether continue to share non-private information. In response to a trigger operation for the continuous forwarding control 708A, only information (the non-private information) that does not carry a privacy icon in the selected information is shared.

In some embodiments, the blocking execution of an operation for the target information may be implemented through the following technical solution: displaying at least one piece of information, the at least one piece of information including the target information; and displaying a screenshot result in response to a screenshot operation for at least one piece of information, in the screenshot result, information for which the receiving object does not have the information sharing permission being subjected to the privacy protection processing, the privacy protection processing including at least one of the following: mosaic processing, blurring, and occlusion addition processing. Through this embodiment of this application, fine-grained privacy protection processing may be performed for the screenshot operation, to prevent the private information from being shared through a screenshot, and improve the comprehensiveness of the information privacy security protection.

Figure 7B:
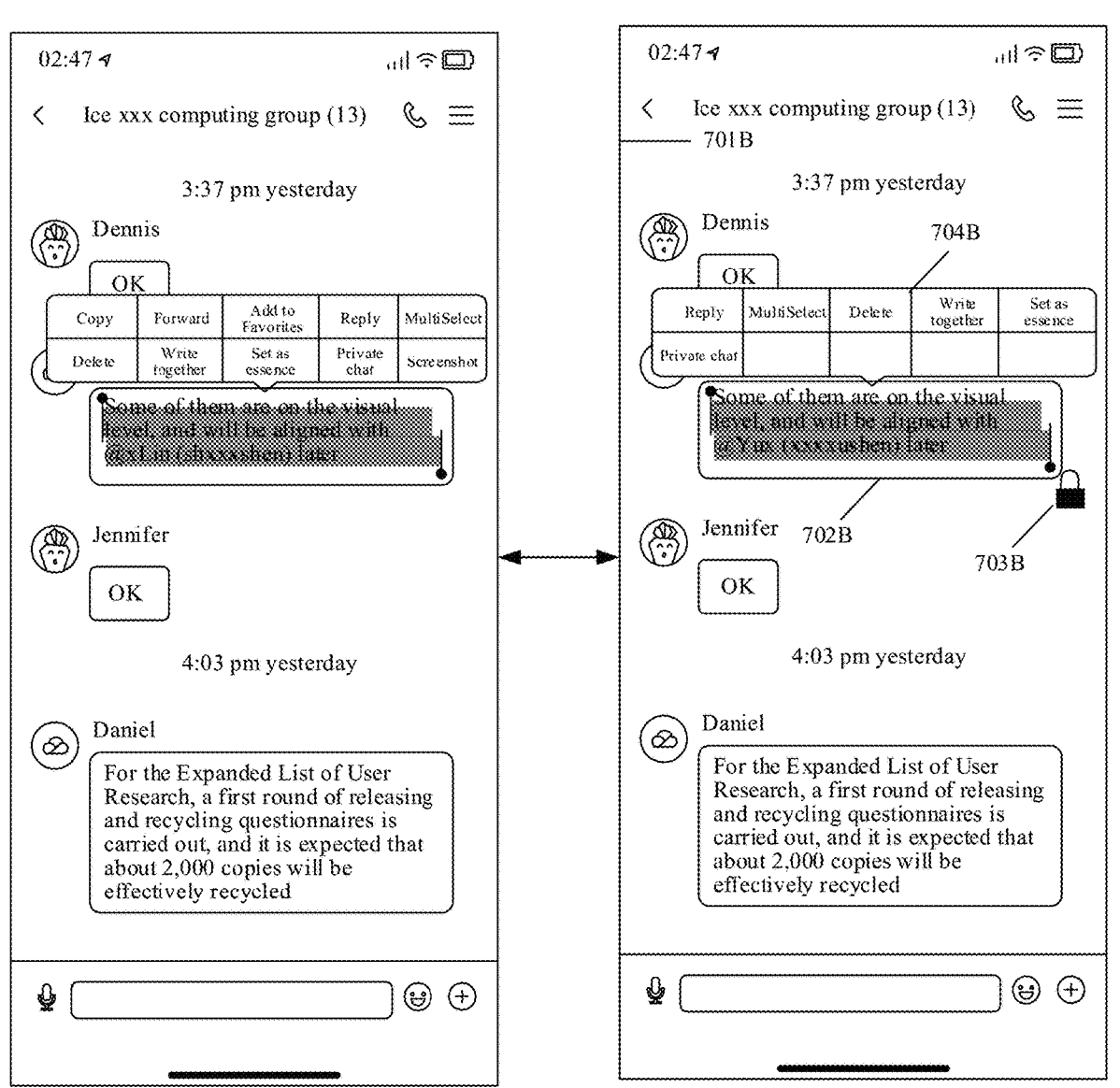
Figure 7C:
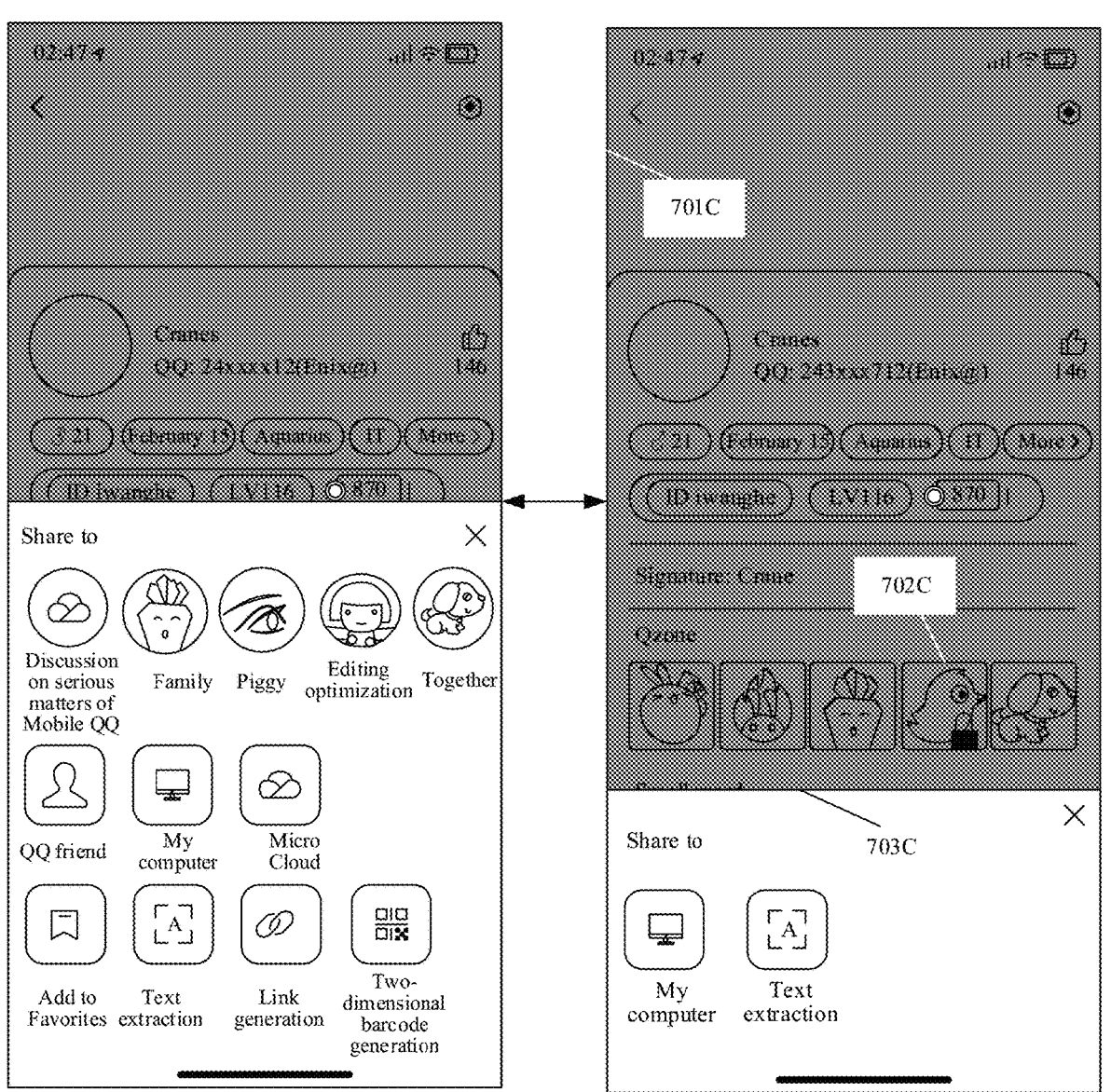
Figure 7D:
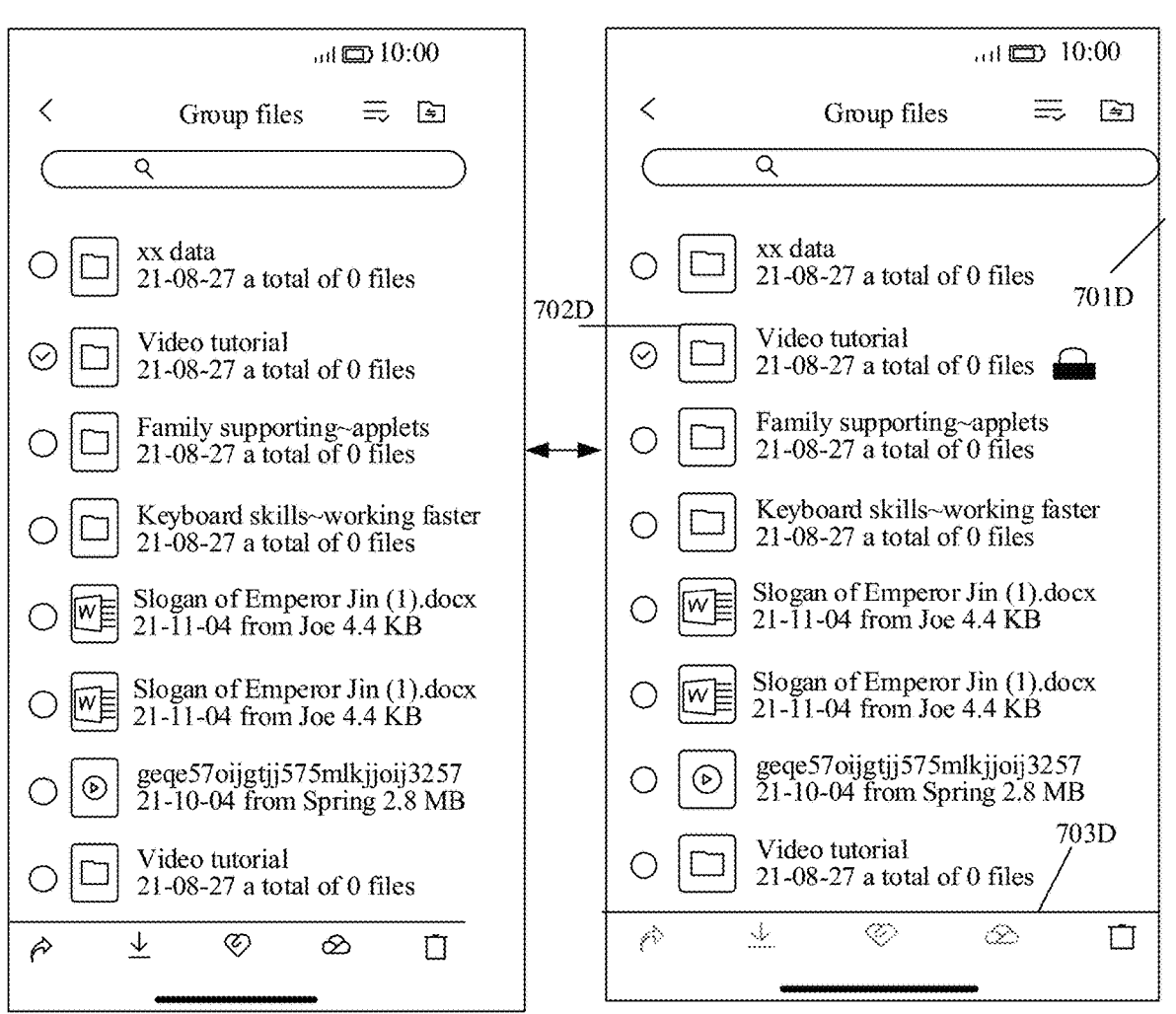
Figure 7E:
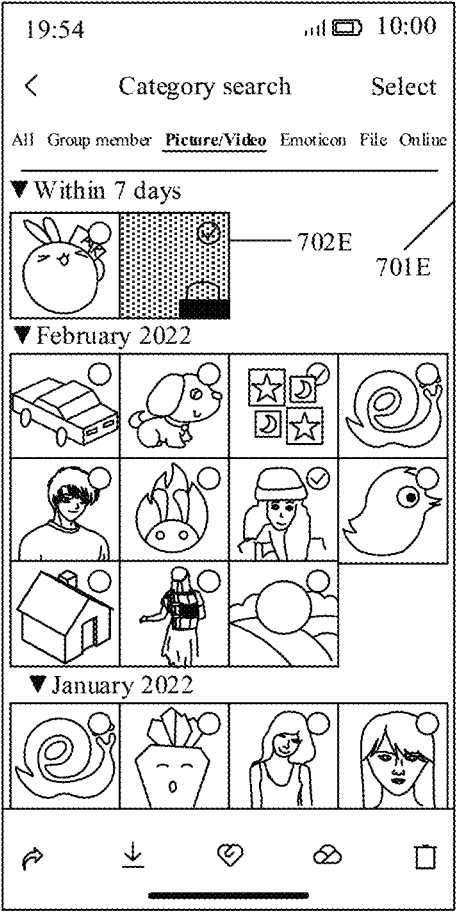
Figure 7F:
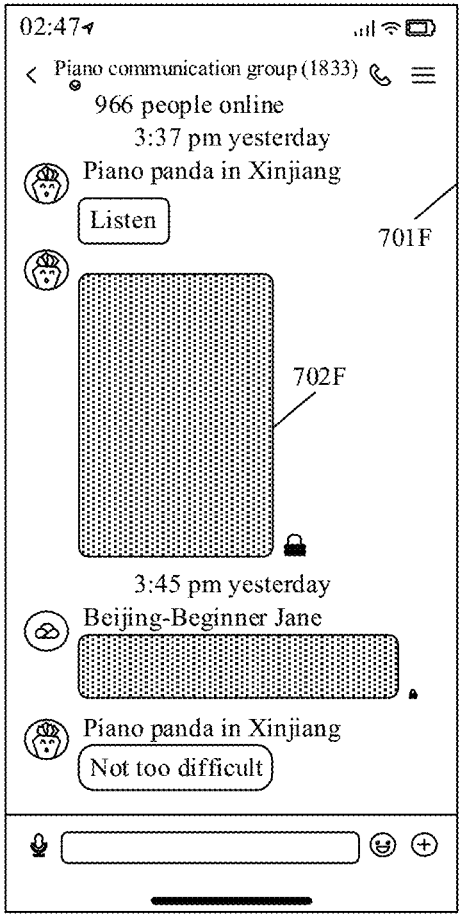

In an example, in a case that a user saves information through a screenshot, to help perform a sharing operation subsequently, private information in the screenshot is blurred. The screenshot may be implemented through a screenshot function of a screenshot software or hardware system. Referring to FIG. 7E and FIG. 7F, FIG. 7E is a schematic diagram showing interfaces of a privacy protection method for a social network according to an embodiment of this application. A plurality of pieces of information are displayed in an information viewing interface 701E. Information 702E carries a privacy icon. Therefore, the information 702E is blurred. FIG. 7F is a schematic diagram showing interfaces of a privacy protection method for a social network according to an embodiment of this application. A plurality of pieces of information are displayed in a session interface 701F. Information 702F carries a privacy icon. Therefore, the information 702F is blurred. Screenshot sharing is not limited to information blurring. Alternatively, mosaic processing may be performed on the private information, the private information may be completely blacked out, or a special pattern may be superimposed on the private information.

Related implementations for the target information provided in this embodiment of this application are also applicable to a transmitting party. That is, on a terminal of the transmitting party, the target information is displayed in the first display mode in a human-computer interaction interface of a transmitting object. Alternatively, the foregoing solution may be implemented to block an operation requiring use of the information sharing permission for the target information.

FIG. 4C is a schematic flowchart of a privacy protection method for a social network according to an embodiment of this application. Descriptions are provided with reference to the processes shown in FIG. 4C.

Process 301: Display, in response to a configuration operation performed by a target object for an information sharing permission for a social network, a configuration result of the information sharing permission.

For specific implementations of process 301, reference may be made to the specific implementations of process 101.

Process 302: Transmit, in response to a trigger operation for transmitting target information, the target information to the social network. The target information may be transmitted to a receiving object or a receiving group through the social network, or the target information may also be dynamically published through the social network. For example, the target information may be dynamically published as a mood on a personal homepage of the target object.

In an example, in a case that the configuration result represents that a receiving object has or does not have the information sharing permission for the target information, that the receiving object does not have the information sharing permission for the target information being represented in a first display mode in a human-computer interaction interface of the receiving object, and that the receiving object has the information sharing permission for the target information being represented in a second display mode, the first display mode being different from the second display mode.

Implementations related to process 101 and process 102 and implementations related to process 201 and process 202 provided in this embodiment of this application all can be combined with technical solutions represented by process 301 and process 302, to obtain combined technical solutions.

Through this embodiment of this application, the information sharing permission is configured, so that in a case that the configuration result represents the transmitted target information is configured with the information sharing permission, the target information is restricted from being shared. In this way, after the target information is transmitted, it can be ensured that the target information cannot be shared at will, which effectively guarantees the privacy security of information. In addition, after the target information is transmitted, the target information is displayed in the first display mode in the session interface, to distinguish, in terms of the display mode, the target information from other information for which no information sharing permission is configured, which can improve the sense of security of a transmit end in terms of the user experience.

An exemplary application of this embodiment of this application in an actual application scenario is described below.

In some embodiments, a target object and a receiving object are social friends in a social APP. A terminal of a target object A receives a configuration operation for information of a text type, and configures the information of a text type such that the information of a text type cannot be shared by a receiving object B. The terminal of the target object A transmits target information to a terminal of the receiving object B through a server. The target information is information of a text type. The target object is an object transmitting the target information. The target information is displayed in a social interface of the terminal, and a privacy identifier is displayed near the target information. The target information is displayed in a social interface of the terminal, and a privacy identifier is displayed near the target information. The terminal receives a press-and-hold operation for the target information and displays a plurality of functional controls, but none of the displayed functional controls can be configured for saving or sharing the target information. The receiving object B cannot perform a sharing operation or an operation related to the sharing operation for the target information.

In some embodiments, a function of setting a chat information sharing permission, for example, setting a sharing permission for single chats or group chats in batches, may be provided for a user. The user may set a sharing permission for chat information transmitted by the user, to prevent information transmitted or uploaded by the user from being is leaked in a case that the information is shared with a friend or group members. The user may set an information sharing permission for friends in a specific group or group chats in batches, or individually set an information sharing permission for a specific friend or a specific group chat.

Using setting an information sharing permission for friends in a specific group in batches as an example, FIG. 5A is a schematic diagram showing interfaces of a privacy protection method for a social network according to an embodiment of this application. A plurality of groups 502A are displayed in an address book 501A. In response to a press-and-hold operation for the group 502A, a chat information permission setting entry 503A is displayed. In response to a trigger operation for the chat information permission setting entry 503A, an information sharing permission setting page is entered. A plurality of social objects 504A belonging to the group 502A and a confirmation control 505A are displayed on the information sharing permission setting page. The user may select multiple or all friends, and after the selection, click/tap a chat information permission change button. In response to the selection operation for the social object 504A and the trigger operation for the confirmation control 505A (the chat information permission change button), a chat information permission change floating layer is displayed. Sharing permission switches for various chat information are displayed in the floating layer. A chat information permission setting control 506A (the sharing permission switch) is displayed for information of each type, including the following information types: 1. general information such as text and emoticons, referring to all information other than pictures/videos and files and online documents transmitted by the user during chatting; 2. picture/video information, referring to picture and video information transmitted by the user during chatting; and 3. file and online document information, referring to file and online document information transmitted by the user during chatting. The user may control whether the foregoing information is set to private information through the sharing permission switch. In a case that the sharing permission switch is switched on, any sharing behavior may be performed on such information. In a case that the sharing permission switch is switched off, no sharing behavior may be performed on such information. Sharing permission switches of all information types is switched on by default. In response to a switch-off operation for any chat information permission setting control 506A, information of a corresponding type is set to information that cannot be shared or saved. After a change made by the user is completed, a finish button on the floating layer may be clicked/tapped, the floating layer disappears, and a change result is saved. In addition, a corresponding permission privacy icon is displayed in the chat information permission setting page. A display rule of the permission privacy icon is as follows: In a case that chat information of all types can be shared, no icon is displayed; in a case that a sharing permission switch for information of a specific type is switched off, a permission privacy icon for the information of the corresponding type is displayed. A display order from left to right is: a text/emoticon information permission icon, a picture/video information permission icon, a file and online document information permission icon. In response to a trigger operation for the finish control 507A, a permission privacy icon 508A for information that cannot be shared or saved is displayed on a selected social object, which cannot be shared or saved, is displayed on the selected social object. For example, neither an image nor a document can be shared or saved, a permission privacy icon for an image and a permission privacy icon for a document are displayed. In a case that a plurality of social objects 504A belonging to a group 502A and a confirmation control 505A are displayed, a select-all control 509A is also displayed. In response to a selection operation for the select-all control 509A and a trigger operation for the confirmation control 505A, a chat information permission setting control 506A may also be displayed for information of each type, and subsequent process are also executed. In response to the trigger operation of the completion control 507A. A permission privacy icon for information that cannot be shared or saved is displayed on all the social objects belonging to this group. Starting from a permission change time, a message that belongs to an information type restricted from being shared and that is transmitted by the user to a configured social object is restricted from being shared. The configured social object is a social object to which the selection operation points because all the subsequent configuration operations are performed for the social object. A message of such type previously transmitted is not restricted. For example, in a case that the user disables a sharing permission for the file, since the disabling, all files transmitted by the user are private files that cannot be shared, and a previously transmitted file can still be shared.

In some embodiments, using setting an information sharing permission for group chats in batches as an example, FIG. 5B is a schematic diagram showing interfaces of a privacy protection method for a social network according to an embodiment of this application. A procedure that the user sets an information sharing permission for group chats in batches is the same as the foregoing procedure of setting an information sharing permission for chats with friends in batches. A plurality of group chat types 502B are displayed in an address book 501B. In response to a press-and-hold operation for the group chat type 502B, a chat information permission setting entry 503B is displayed. In response to a trigger operation for the chat information permission setting entry 503B, an information sharing permission setting page for a chat in at least one group chat of the group chat type is entered. At least one group chat 504B belonging to the group chat type 502B and a confirmation control 505B are displayed on the information sharing permission setting page. The user may select multiple or all group chats, and after the selection, click/tap a chat information permission change button (the confirmation control). In response to the selection operation for the group chat 504B and the trigger operation for the confirmation control 505B (the chat information permission change button), a chat information permission change floating layer is displayed. Sharing permission switches for various chat information are displayed in the floating layer. A chat information permission setting control 506B (the sharing permission switch) is displayed for information of each type, including the following information types of the transmitted or uploaded information: 1. general information such as text and emoticons, referring to all information other than pictures/videos and files and online documents transmitted by the user during chatting; 2. picture/video information, referring to picture and video information transmitted by the user during chatting; 3. file and online document information, referring to all file and online document information transmitted or loaded by the user to the group files during group chatting; and 4. a group album, referring to pictures/videos uploaded by the user to the group album. The user may control whether the foregoing information is set to private information through the sharing permission switch. In a case that the sharing permission switch is switched on, any sharing behavior may be performed on such information. In a case that the sharing permission switch is switched off, no sharing behavior may be performed on such information. Sharing permission switches of all information types is switched on by default. In response to a switch-off operation for any chat information permission setting control 506B, information of a corresponding type is set to information that cannot be shared or saved. After a change made by the user is completed, a finish button on the floating layer may be clicked/tapped, the floating layer disappears, and a change result is saved. In addition, a corresponding permission privacy icon is displayed in the chat information permission setting page. A display rule of the permission privacy icon is as follows: In a case that chat information of all types can be shared, no icon is displayed; in a case that a sharing permission switch for information of a specific type is switched off, a permission privacy icon for the information of the corresponding type is displayed. A display order from left to right is: a text/emoticon information permission icon, a picture/video information permission icon, a file and online document information permission icon. In response to a trigger operation for the finish control 507B, a permission privacy icon 508B for information that cannot be shared or saved is displayed on a selected group chat attachment, which cannot be shared or saved, is displayed on the selected social object. For example, neither an image nor a document can be shared or saved, a permission privacy icon for an image and a permission privacy icon for a document are displayed. In a case that a plurality of social objects 504B belonging to a group 502B and a confirmation control 505B are displayed, a select-all control 509B is also displayed. In response to a selection operation for the select-all control 509B and a trigger operation for the confirmation control 505B, a chat information permission setting control 506B may also be displayed for information of each type, and subsequent process are also executed. In response to the trigger operation of the completion control 507B. A permission privacy icon for information that cannot be shared or saved is displayed on all the group chats belonging to the group chat type.

In some embodiments, using setting an information sharing permission for a specific friend or a specific group chat individually as an example, FIG. 5C is a schematic diagram showing interfaces of a privacy protection method for a social network according to an embodiment of this application. A setting entry 502C is displayed in a data card 501C of a friend A. In response to a trigger operation for the setting entry 502C, a chat information permission setting entry 503C is displayed. In response to a trigger operation for the chat information permission setting entry 503C, sharing permission switches for various chat information are displayed, that is, chat information permission setting controls 504C (sharing permission switches) for various information are displayed, including the following information types: 1. general information such as text and emoticons, referring to all information other than pictures/videos and files and online documents transmitted by the user during chatting; 2. picture/video information, referring to picture and video information transmitted by the user during chatting; and 3. file and online document information, referring to file and online document information transmitted by the user during chatting. The user may control whether the foregoing information is set to private information through the sharing permission switch. In a case that the sharing permission switch is switched on, any sharing behavior may be performed on such information. In a case that the sharing permission switch is switched off, no sharing behavior may be performed on such information. Sharing permission switches of all information types is switched on by default. In response to a switch-off operation for any chat information permission setting control 504C, information of a corresponding type is set, for the friend A, to information that cannot be shared or saved.

In some embodiments, using setting an information sharing permission for a specific friend or a specific group chat individually as an example, FIG. 5D is a schematic diagram showing interfaces of a privacy protection method for a social network according to an embodiment of this application. A setting entry is displayed in a data card of a group chat A. In response to a trigger operation for the setting entry, a chat information permission setting entry 501D is displayed. In response to a trigger operation for the chat information permission setting entry 501D, sharing permission switches for various chat information are displayed, that is, chat information permission setting controls 502D (sharing permission switches) for different types of information are displayed, including the following information types of the transmitted or uploaded information: 1. general information such as text and emoticons, referring to all information other than pictures/videos and files and online documents transmitted by the user during chatting; 2. picture/video information, referring to picture and video information transmitted by the user during chatting; 3. file and online document information, referring to all file and online document information transmitted or loaded by the user to the group files during group chatting; and 4. a group album, referring to pictures/videos uploaded by the user to the group album. The user may control whether the foregoing information is set to private information through the sharing permission switch. In a case that the sharing permission switch is switched on, any sharing behavior may be performed on such information. In a case that the sharing permission switch is switched off, no sharing behavior may be performed on such information. Sharing permission switches of all information types is switched on by default. In response to a switch-off operation for any chat information permission setting control 502D, information of a corresponding type is set, for members of the group chat A, to information that cannot be shared or saved.

In some embodiments, setting entries and setting methods of the user may be set in batches based on friend groups and group chat groups, or may be individually set for a specific friend and a specific group, or a specific object is added based on a permission for an information type. FIG. 5E is a schematic diagram showing interfaces of a privacy protection method for a social network according to an embodiment of this application. A system privacy setting interface 501E displays a permission setting entry 502E. In response to a trigger operation for the permission setting entry 502E, a chat information permission setting entry 503E is displayed. In response to a trigger operation for the chat information permission setting entry 503E, configuration entries 504E for different types of chat information are displayed. In response to a trigger operation for the configuration entries 504E for the different types of chat information, an object 505E for a specific corresponding type of chat information that cannot be shared is displayed. In response to a trigger operation for an addition control 506E, candidate objects are displayed. In response to a selection operation for a candidate object, the selected object may be determined as an object for which a specific type of chat information that cannot be shared.

In some embodiments, the division dimensions of information types are not limited to the foregoing division methods, and may be divided in more detail into: text messages, voice messages, picture messages, video messages, and the like. Alternatively, a permission may be uniformly set for all messages without distinguishing between message types, but in a group, division may be performed according to member types. For example, for all messages, whether the following types of people can share information may be set: for example, a group owner, an administrator, and an ordinary group member. Alternatively, distinguishing may be performed in a time dimension. All messages in the last 3 days can be shared, all messages in the last week can be shared, messages in the last 15 days can be shared, messages in the last month can be shared, and messages older than one month can be shared.

Figure 6A:
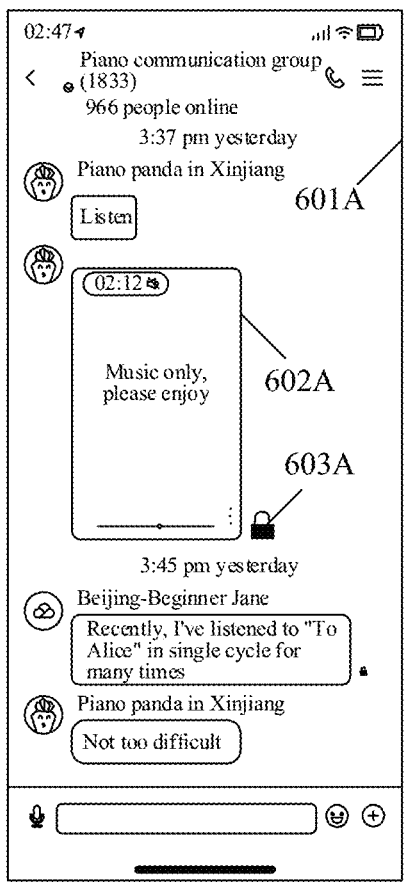
FIG. 6A to FIG. 6C are schematic diagrams showing interfaces of a privacy protection method for a social network according to an embodiment of this application.
Figure 6B:
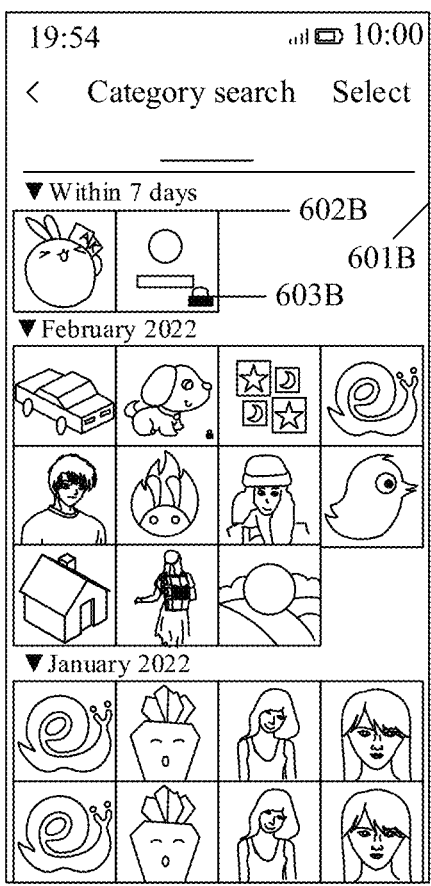
Figure 6C:
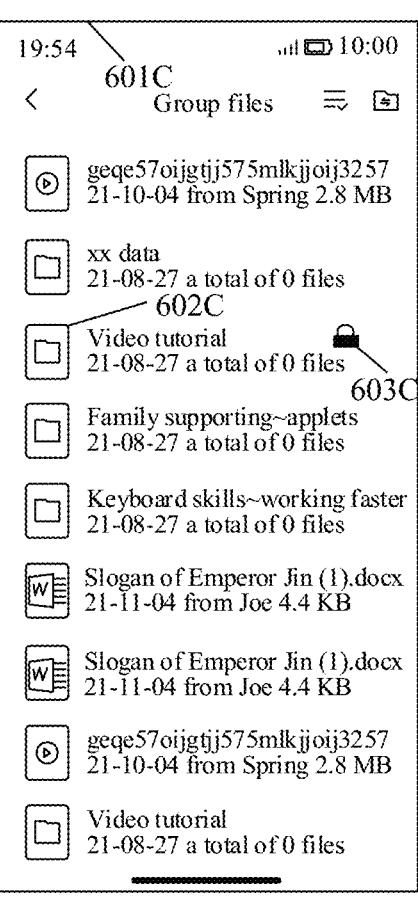

In some embodiments, in a case that the user sets information of a specific type as private information, a privacy icon is displayed for any information of the type transmitted or uploaded. FIG. 6A is a schematic diagram showing interfaces of a privacy protection method for a social network according to an embodiment of this application. Video information 602A is displayed in a social interface 601A of a group chat A. Because information of a video type is set to private information in the group chat A, a privacy icon 603A is also displayed near the video information 602A. FIG. 6B is a schematic diagram showing interfaces of a privacy protection method for a social network according to an embodiment of this application. First video information 602B is displayed in an information viewing interface 601B of a group chat B. Because information of a video type is set to private information in the group chat B since February a privacy icon 603B is also displayed near the first video information 602B. FIG. 6C is a schematic diagram showing interfaces of a privacy protection method for a social network according to an embodiment of this application. First video information 602C is displayed in a group file interface 601C of a group chat C. Because information of a video type is set to private information, a privacy icon 603C is also displayed near the first video information 602C.

In some embodiments, the private information is not limited to the foregoing displayed method using an icon with a lock pattern, and may be marked in a form of another icon, or the icon may be replaced with a text prompt, for example, "private." A card style or text style of private information is different from that of non-private information. For example, a card of private information has a black background and white text, or text of private information may be uniformly text in italics, gray, and bold. Text of the information is blurred, and a clear version can be viewed only in a case that a press-and-hold operation is performed on the information or a details page is entered.

In some embodiments, others cannot perform any sharing behavior on information with a privacy icon. In a case that others perform any sharing behavior on information with a privacy icon, they need to be reminded. FIG. 7A is a schematic diagram showing interfaces of a privacy protection method for a social network according to an embodiment of this application. Video information 702A and a privacy icon 703A are displayed in a session interface 701A. In response to a trigger operation for the video information 702A, an operation panel 704A for the video information 702A is displayed. Sharing operations and saving operations need to be blocked for private information of any type. The operation panel 704A does not include any control related to saving and sharing. In response to a trigger operation for a multi-select functional control, a check box 705A for each piece of information is displayed in the session interface 701A. In response to a selection operation for information, a check mark is displayed in the check box 705A corresponding to the information. For example, all pieces of selected information have a privacy icon, or some pieces of selected information have a privacy icon. In a case that all pieces of selected information have a privacy icon, all sharing and saving controls are in a non-triggerable state, for example, a forwarding control 709A in a gray state. In a case that some pieces of selected information have a privacy icon, prompt information is displayed during sharing, to prompt that private information may not be shared. In response to a trigger operation for a forwarding control 706A, prompt information 707A and a continuous forwarding control 708A are displayed. The prompt information is configured to inform a user that a sharing permission is set for some pieces of information and the pieces of information cannot be shared or saved, and whether continue to share non-private information. In response to a trigger operation for the continuous forwarding control 708A, only information that does not carry a privacy icon in the selected information is shared.

In some embodiments, similar sharing blocking processing is performed for text, pictures, and files. All sharing and saving operations can be blocked in various operation pages related to sharing and saving. FIG. 7B to FIG. 7D are schematic diagrams showing interfaces of a privacy protection method for a social network according to an embodiment of this application. Referring to FIG. 7B, text information 702B and a privacy icon 703B are displayed in a session interface 701B. In response to a trigger operation for the privacy icon 703B, an operation panel 704B for the text information 702B is displayed. Sharing operations and saving operations need to be blocked for private information of any type. The operation panel 704B does not include any control related to saving and sharing. Referring to FIG. 7C, image information 702C published by a user and a privacy icon 703C corresponding to the image information are displayed in a user data interface 701C. In response to a press-and-hold operation for the image information 702C, an operation panel 703C for the image information 702C is displayed. The operation panel 703C does not include any operation control related to saving and sharing. Referring to FIG. 7D, image information 702D uploaded by a user to a group chat and a privacy icon 703D corresponding to the image information are displayed in a group file interface 701D. In response to a selection operation for the image information 702D, an operation panel 703D for the image information 702D is displayed. All operation controls related to saving and sharing in the operation panel 703D are in a non-triggerable state and are displayed in a gray state.

In some embodiments, in a case that a user saves information through a screenshot, to help perform a sharing operation subsequently, private information in the screenshot is blurred. The screenshot may be implemented through a screenshot function of a screenshot software or hardware system. Referring to FIG. 7E and FIG. 7F, FIG. 7E is a schematic diagram showing interfaces of a privacy protection method for a social network according to an embodiment of this application. A plurality of pieces of information are displayed in an information viewing interface 701E. Information 702E carries a privacy icon. Therefore, the information 702E is blurred. FIG. 7F is a schematic diagram showing interfaces of a privacy protection method for a social network according to an embodiment of this application. A plurality of pieces of information are displayed in a session interface 701F. Information 702F carries a privacy icon. Therefore, the information 702F is blurred. Screenshot sharing is not limited to information blurring. Alternatively, mosaic processing may be performed on the private information, the private information may be completely blacked out, or a special pattern may be superimposed on the private information.

The foregoing are all setting a sharing permission for information that is self-published and that cannot be shared, are not limited to instant social chatting scenarios, and may also be applied to various social scenarios such as personal homepages. In self-published information, sharing permissions may be set for the self-published information for different people, or sharing permissions may be set for information published at different times. The information carrying a privacy icon mentioned above may be shared by the user publishing it.

Figure 8:
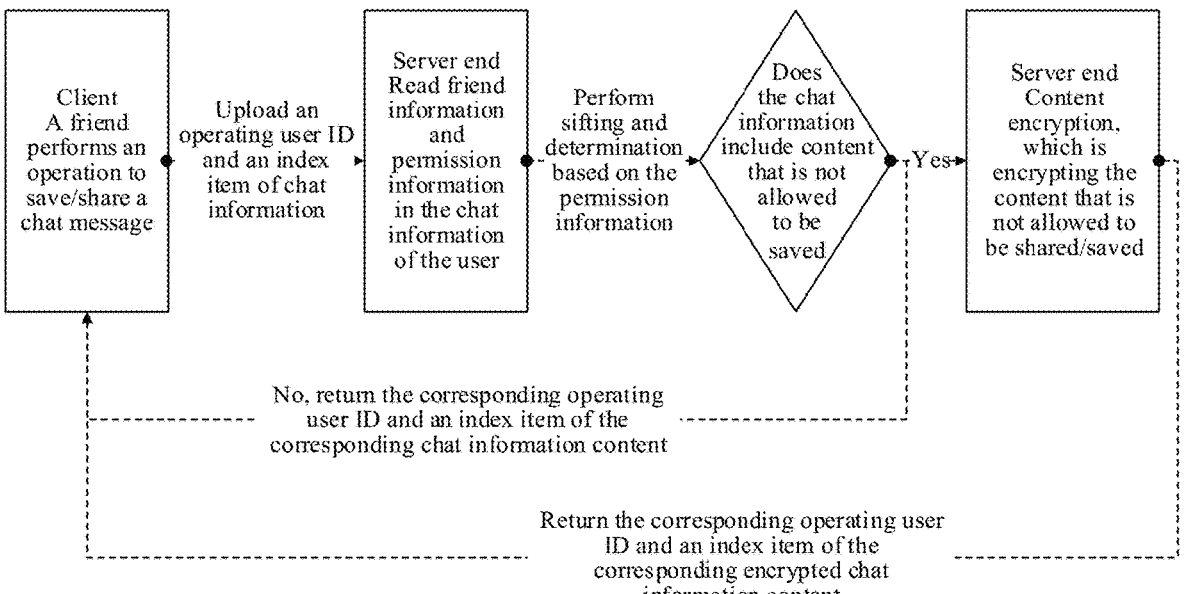
FIG. 8 is a schematic flowchart of a privacy protection method for a social network according to an embodiment of this application.

In some embodiments, FIG. 8 is a schematic flowchart of a privacy protection method for a social network according to an embodiment of this application, relating to a client and a server end. On the client, a saving operation and a sharing operation performed by a user for chat information are received. The client transmits a user identifier and an index item of the chat information to the server end. The server end reads user information and permission information of the chat information. The server end performs sifting and determination based on the permission information. In a case that the chat information includes content for which the user is prohibited from saving and sharing, the server end encrypts the content for which the user is prohibited from saving and sharing. The server end transmits the index item of the encrypted chat information to the client based on the user identifier. In a case that the chat information does not include content for which the user is prohibited from saving and sharing, the server end transmits the index item of the chat information to the client based on the user identifier. A friend chat information permission may be set. A session list or a friend list is entered, to choose to enter a chat information setting interface of a specific friend. Individual permission settings on text information, pictures/videos, and chat files are supported. A permission setting operation may be performed for a single friend or a plurality of friends. After the permission setting is completed, only an operation on chat information allowing sharing or saving is supported. A chat information permission of a group chat may be set. A group chat session list or a group management list is entered. Individual permission settings on text information, pictures/videos, and chat files are supported. A permission setting operation may be performed for a single group chat or a plurality of group chats. After the permission setting is completed, only an operation on chat information allowing sharing or saving is supported.

In some embodiments, the infrastructure of the server end includes an access layer, a communication layer, and a data layer. The access layer is mainly responsible for message transmitting and receiving: transmitting access, receiving access, and message transmission. The access layer is also responsible for performing determination and display of input/output of single chat information or group chat information. The communication layer performs distribution, storage, and compatibility for different message states based on client logic while retaining an information state, that is, storing, pushing, or notifying an information state. A message type includes a basic message, an audio/video message, a rich media message, and the like. The communication layer is also responsible for implementing a message spreading service and a ramble service. The data layer stores basic information of a user based on an OI database service, the basic information including login information, contact information, chat information, and sharing permission setting information corresponding to the user. The data layer obtains a message storage instruction based on a communication protocol, to update ramble data and perform encrypted storage of background data for the chat information that needs to be stored while filtering the sharing permission setting information set by the user.

Figure 9:
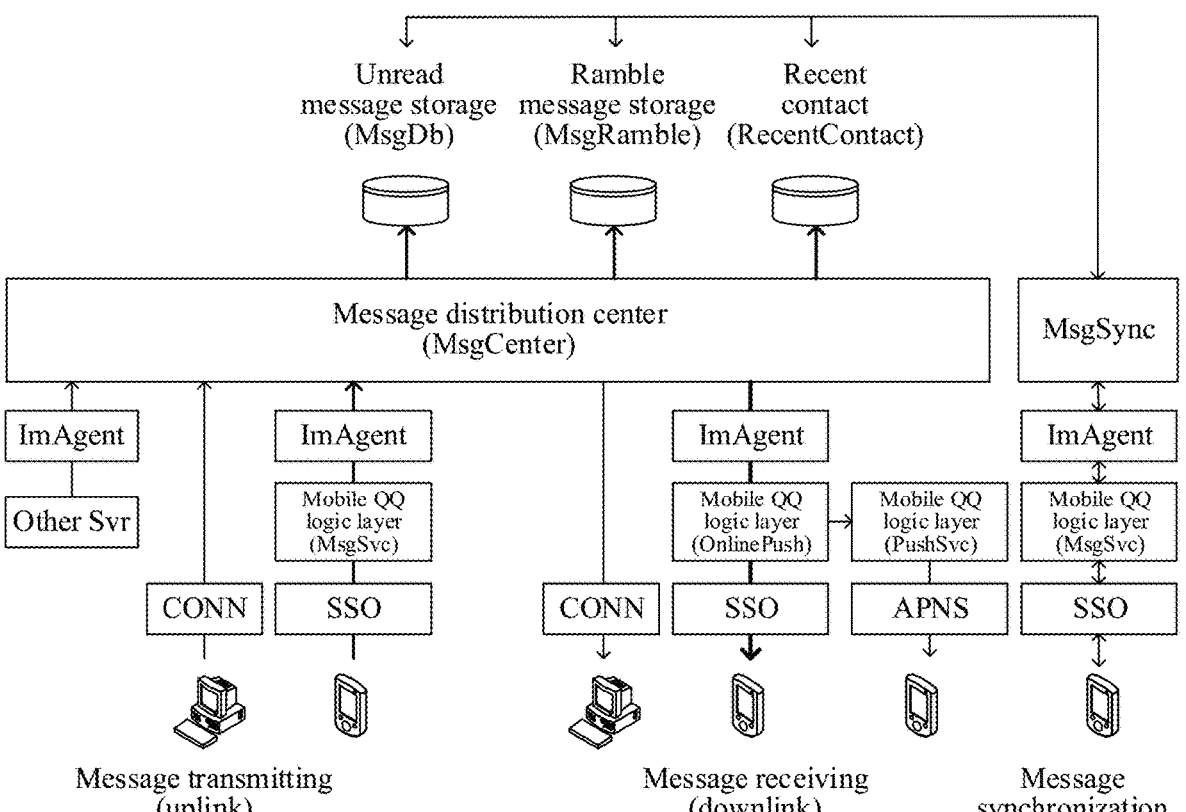
FIG. 9 is a schematic structural diagram showing transmitting, receiving, and storing a single chat message according to an embodiment of this application.

In some embodiments, FIG. 9 is a schematic structural diagram showing transmitting, receiving, and storing a single chat message according to an embodiment of this application. Another server transmits information to a message distribution center through an instant messaging agent (ImAgent). A computer terminal transmits information to the message distribution center through a CONN interface. A mobile phone terminal transmits information to a mobile phone client logic layer through an SSO interface, and the mobile phone client logic layer transmits the information to the instant messaging agent. The instant messaging agent transmits information to message distribution center (MsgCenter). The message distribution center transmits the information to a message database (MsgDb) for storing an unread message. The message distribution center transmits the information to a ramble message database (MsgRamble) for storing a ramble message. The message distribution center transmits the information to a contact database (RecentContact) for storing a recent contact The message database (MsgDb), the ramble message database (MsgRamble), and the contact database (RecentContact) transmit stored data to a message synchronization service (MsgSync). Data synchronization is implemented among the message synchronization service, the instant messaging agent, and the mobile phone client logic layer (MsgSvc) that is responsible for the information service, and synchronized data is transmitted to the mobile phone client through the SSO interface to achieve message synchronization. The message distribution center transmits the information to the computer terminal through the CONN interface. The message distribution center transmits the information to the instant messaging agent. The instant messaging agent transmits the information to the mobile phone client logic layer (OnlinePush) that is responsible for online pushing. The mobile phone client logic layer (OnlinePush) that is responsible for online pushing transmits the information to the mobile phone terminal through the SSO interface. The mobile phone client logic layer that is responsible for online pushing transmits the information to a mobile phone client logic layer (PushSvc) that is responsible for a notification service). The mobile phone client logic layer that is responsible for a notification service transmits the information to the mobile phone terminal through an APNS interface.

Figure 10:
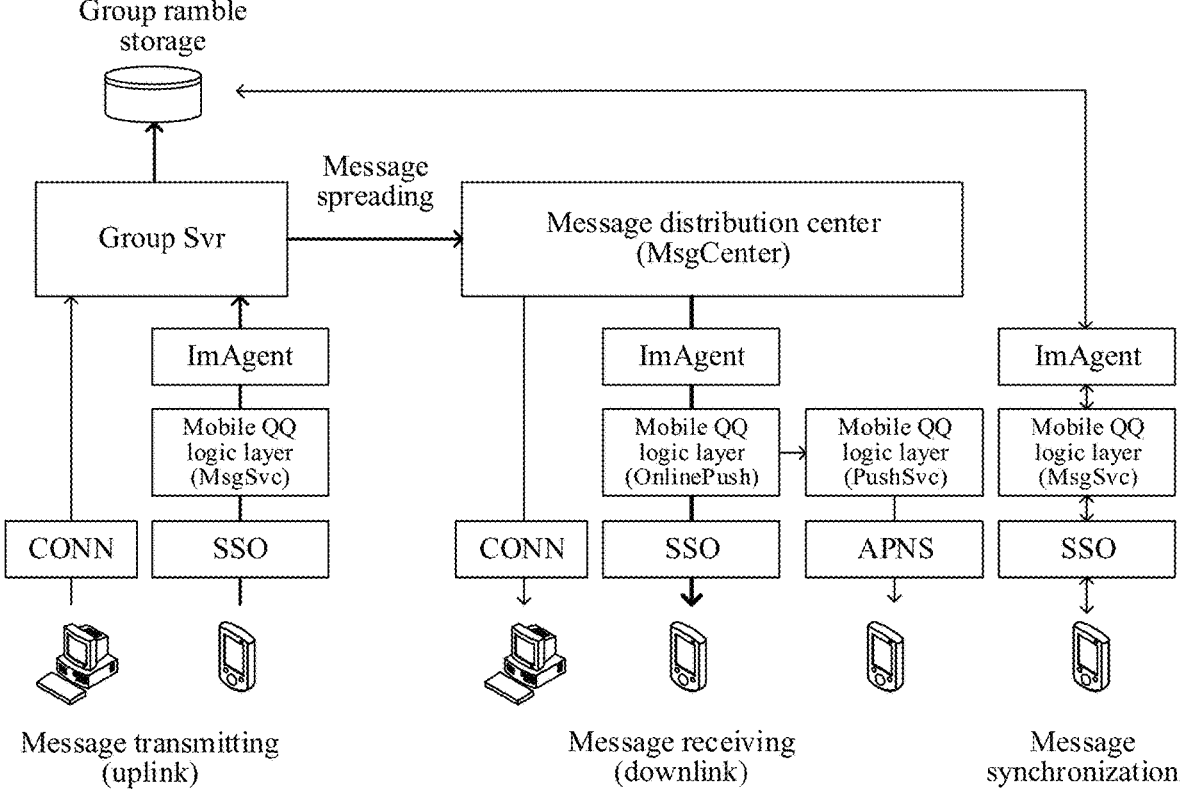
FIG. 10 is a schematic structural diagram showing transmitting, receiving, and storing a group chat message according to an embodiment of this application.

In some embodiments, FIG. 10 is a schematic structural diagram showing transmitting, receiving, and storing a group chat message according to an embodiment of this application. A computer terminal transmits information to a group chat server through a CONN interface. A mobile phone terminal transmits information through an SSO interface to a mobile phone client logic layer that is responsible for a messaging service. The mobile phone client logic layer that is responsible for a messaging service transmits the information to an instant messaging agent. The instant messaging agent transmits the information to the group chat server. The group chat server spreads messages to a message distribution center. The message distribution center transmits the information to the computer terminal through the CONN interface. The message distribution center transmits the information to the instant messaging agent. The instant messaging agent transmits the information to a mobile phone client logic layer that is responsible for online pushing. The mobile phone client logic layer that is responsible for online pushing transmits the information to the mobile phone terminal through the SSO interface. The mobile phone client logic layer that is responsible for online pushing transmits the information to a mobile phone client logic layer that is responsible for a notification service, to transmit the information to the mobile phone terminal through an APNS interface. The group chat server transmits the information to a group ramble storage. The group ramble storage synchronizes the information to an OI database. The OI database synchronizes the information to a mobile phone client logic layer that is responsible for a messaging service. The mobile phone client logic layer that is responsible for a messaging service synchronizes the information to the mobile phone terminal through the SSO interface.

In some embodiments, data that the server end needs to store includes: friend accounts, friend names, chat content and files (pictures, videos, emoticons, and files), message sharing permission setting information, group numbers, group names, group files (pictures, videos, emoticons, and files), message sharing permission setting information, whether to perform processing in batches, and file encryption keys. A procedure that the server end stores friend chat information and determines permission settings is as follows: The server end pulls, based on a friend account provided by a client, chat content and files satisfying a storage time period; and in response to a user operation received by the client, a sharing permission is determined for a user message, and information processing, for example, encryption, is performed based on a determination result. A procedure that the server end stores group chat information is as follows: The server end pulls, based on a group number provided by a client, chat content and files satisfying a storage time period; and in response to a user operation received by the client, a sharing permission is determined for a user message, and information processing, for example, encryption, is performed based on a determination result.

Figure 11:
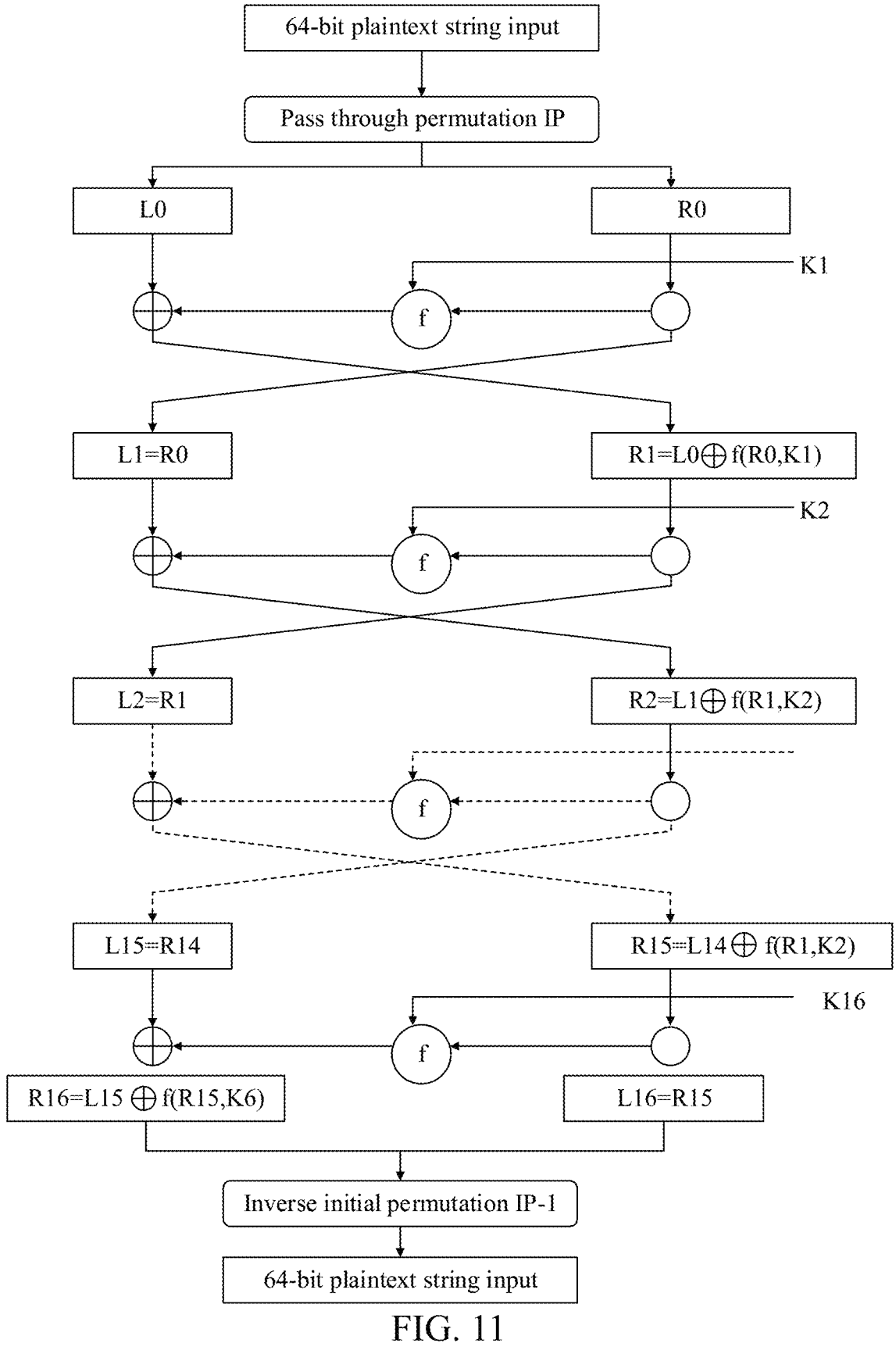
FIG. 11 is a schematic diagram showing a symmetric encryption algorithm according to an embodiment of this application.

In some embodiments, FIG. 11 is a schematic diagram showing a symmetric encryption algorithm according to an embodiment of this application. The server end uses a symmetric encryption algorithm for pictures, videos, and other files: performing encryption using 48 bits of a key, where an encryption process is to first perform an initial permutation on a 64-bit plaintext group, then divide the 64-bit plaintext group into left and right parts to perform 16 iterations on the left and right parts respectively, then perform circular shifts and transformations, and finally perform an inverse transformation to obtain ciphertext. The symmetric encryption algorithm turns a 64-bit plaintext input block into a 64-bit ciphertext output block and also uses a key of 64 bits (56 bits are actually used, and the $8^{th}$, $16^{th}$, $24^{th}$, $32^{nd}$, $40^{th}$, $48^{th}$, $56^{th}$, and $64^{th}$ bits are check bits, so that each key has an odd number of values 1). The algorithm is mainly divided into two processes: 1) Initial permutation. Its function is to re-combine an inputted 64-bit data block by bit and divide an output into two parts, L0 and R0, each part being 32 bits long. A permutation rule is to change the inputted $58^{th}$ bit to the first bit, the $50^{th}$ bit to the $2^{nd}$ bit . . . and so on, the last bit being the original $7^{th}$ bit. L0 and R0 are two parts outputted after the permutation, L0 being the outputted left 32 bits, and R0 being the outputted right 32 bits. For example, in a case that an input value before the permutation is to D1D2D3 . . . D64, a result after the initial permutation is L0=D58D50 . . . D8 and R0=D57D49 . . . D7. 2) Inverse permutation. After 16 iterative operations, L16 and R16 are obtained and used as inputs to perform inverse permutation. The inverse permutation is exactly an inverse operation of the initial permutation, so that a ciphertext output is obtained.

In some embodiments, the client mainly includes three important modules, including a network layer, a data layer, and a display layer. The network layer includes modules for communication with a client and a backend server, to transmit the following data to the server: data for which a group owner sets a session information sharing permission, data for which the group owner sets an encrypted information sharing permission, and data for which the group owner sets a live streaming sharing permission, and receive a push from the server and the like. After receiving data, the client updates the data to the data layer. The underlying communication protocol is the User Data Protocol. In a case that the network cannot be connected, a connection failure is prompted. A function of the data layer is as follows: storing client-related data. The client-related data includes basic information, including group basic information, group member information, viewed group pictures/group videos, friend information, friend chat data, viewed friend chat files, and the like. Data is stored in an in-memory cache and a local database. In a case the in-memory cache does not have data stored therein, corresponding data is loaded from the database, and cached into the in-memory cache, to improve the obtaining speed. After receiving data from the server, the client updates the in-memory cache and the database simultaneously. A function of the display layer is as follows: The client is responsible for a user interface display part, mainly including two parts. The first part is display of in-group information content (including group pictures, group files, and group videos), group basic information, and avatars and names, for which a standard system control is responsible. The second part is display of an icon, which is display a corresponding icon in a current window. The display layer is also responsible for responding to an interaction operation performed by a user, and calling back to a corresponding function for processing, for which a system control provides capability support.

In this embodiment of this application, a user may set a sharing permission for transmitted chat information for a single chat with a friend and a group chat, to effectively protect the privacy of chat information of a platform user and improving the sense of security provided by a product to users. Individually setting permissions for different types of information is supported, which improves the freedom of user information privacy management.

It may be understood that, in the embodiments of this application, related data, such as user information, may be involved. In a case that the embodiments of this application is applied to a specific product or technology, a permission or an approval from a user needs to be obtained. In addition, collection, use, and processing of the related data need to comply with relevant laws, regulations, and standards of relevant countries and regions.

An exemplary structure of a privacy protection apparatus 455 for a social network provided in this embodiment of this application and implemented as a software module is further described below.

In some embodiments, as shown in FIG. 3, software modules in a privacy protection apparatus 455-1 for a social network stored in a memory 450 may include: a first configuration module 4551, configured to display, in response to a configuration operation for an information sharing permission for the social network, a configuration result of the information sharing permission; and a first transmitting module 4552, configured to display target information in response to a trigger operation for transmitting the target information, the target information being displayed in a first display mode in a case that the configuration result represents that the target information is configured with the information sharing permission, and the target information being displayed in a second display mode different from the first display mode in a case that the configuration result represents that the target information is not configured with the information sharing permission.

In some embodiments, the first configuration module 4551 is further configured to display an address book interface, the address book interface including an address book of a target object, the target object being an object transmitting the target information; display at least one object in a selected state in response to a selection operation for the address book; display, in response to a configuration operation for an information sharing permission for the at least one object, a configuration result of the information sharing permission corresponding to the at least one object in the address book, the configuration result recording the following information: the at least one object does not have the information sharing permission.

In some embodiments, the first configuration module 4551 is further configured to display a permission switch control, the permission switch control including permission switches respectively corresponding to a plurality of information types; and perform the following processing on each object in the at least one object in response to a configuration operation of switching off a permission switch corresponding to a first information type, the first information type being any information type in the plurality of information types: displaying an information type identifier of the first information type in a region corresponding to the object in the address book, to represent that the object does not have the information sharing permission for the first information type.

In some embodiments, the first configuration module 4551 is further configured to perform the following processing on each object: displaying an information type identifier of each information type in a region corresponding to the object in the address book, to represent that the object does not have the information sharing permission for all information types.

In some embodiments, the address book includes at least one of the following lists: an object list, an object group list, and a group chat group list. The first configuration module 4551 is further configured to perform any of the following processing: displaying the at least one object in the selected state in response to a selection operation for the object list; displaying, in response to a viewing operation for a first object group in the object group list, a plurality of objects included in the first object group, the first object group being any object group in the object group list, and displaying, in response to a selection operation for at least one object included in the first object group, the at least one object in a selected state; and displaying, in response to a viewing operation for a first group chat group in the group chat group list, a plurality of group chats included in the first group chat group, the first group chat group being any group chat group in the group chat group list, and displaying, in response to a selection operation for at least one group chat included in the first group chat group, the at least one group chat in a selected state, each group chat including a plurality of objects.

In some embodiments, an effect-taking moment of the information sharing permission includes at least one of the following: a change moment, the change moment being a moment at which the information sharing permission is generated or updated according to the configuration operation; and a specified moment, the specified moment being a moment configured to be later than the change moment.

In some embodiments, the first configuration module 4551 is further configured to display a setting interface of a social object, the setting interface including a dimension for configuring the information sharing permission, and the social object being any object having a social relationship with a target object of the target information, the dimension including at least one of the following: an information type and a time period; and display, in response to a configuration operation based on at least one dimension, a configuration result of the information sharing permission corresponding to the at least one dimension, the configuration result recording at least one of the following information: the social object does not have the information sharing permission for the information type; and the social object is prohibited from using the information sharing permission in the time period.

In some embodiments, in a case that the dimension is the information type, the first configuration module 4551 is further configured to display a permission switch control, the permission switch control including permission switches respectively corresponding to a plurality of information types; and display, in response to a configuration operation of switching off a permission switch corresponding to a first information type, the first information type being any information type in the plurality of information types, an information type identifier of the first information type in the setting interface of the social object, to represent that the social object does not have the information sharing permission for the first information type.

In some embodiments, the first configuration module 4551 is further configured to display a setting interface of a social group to which a target object belongs, the target object being an object transmitting the target information, the setting interface including a dimension for configuring the information sharing permission, the dimension including at least one of the following: an information type, an identity, and a time period; and display, in response to a configuration operation based on at least one dimension, a configuration result of the information sharing permission corresponding to the at least one dimension, the configuration result recording at least one of the following information through a blacklist: the information type for which use of the information sharing permission is prohibited; another object in the social group other than the target object is prohibited from using the information sharing permission in the time period; and an object having the identity in the social group is prohibited from using the information sharing permission.

In some embodiments, in a case that the dimension is the identity, the first configuration module 4551 is further configured to display a permission switch control, the permission switch control including permission switches respectively corresponding to a plurality of identities; and display, in response to a configuration operation of switching off a permission switch corresponding to a first identity, the first identity being any identity in the plurality of identities, an identity identifier of the first identity in the setting interface of the social group, to represent that an object of the first identity does not have the information sharing permission.

In some embodiments, the first configuration module 4551 is further configured to display a configuration interface of the information sharing permission, the configuration interface including configuration entries respectively corresponding to a plurality of information types; display an object addition interface in response to a trigger operation for a configuration entry of a second information type, the second information type being any information type in the plurality of information types, the object addition interface including an object set, an object in the object set not having the information sharing permission for the second information type; and add the at least one object to the object set corresponding to the second information type in response to a configuration operation of adding the at least one object to the object set.

In some embodiments, the first configuration module 4551 is further configured to display an information type identifier of the second information type in a region corresponding to each object in the object set, to represent that an object in the object set does not have the information sharing permission for the second information type.

In some embodiments, the first configuration module 4551 is further configured to display a set time period in response to a time period setting operation for the information sharing permission; and display the configuration result of the information sharing permission in response to a configuration operation of updating the information sharing permission based on the time period, the configuration result recording the following information: an object receiving any information is prohibited from using the information sharing permission in the time period.

In some embodiments, as shown in FIG. 3, software modules in a privacy protection apparatus 455-2 for a social network stored in a memory 450 may include: a receiving module 4553, configured to receive target information from the social network; and a display module 4554, configured to display, in response to that a receiving object does not have an information sharing permission for the target information, the target information in a first display mode in a human-computer interaction interface of the receiving object, the first display mode being different from a second display mode, the second display mode being a display mode adopted in response to that the receiving object has the information sharing permission for the target information.

In some embodiments, the display module 4554 is further configured to perform any of the following processing: displaying the target information and a privacy icon corresponding to the target information in the human-computer interaction interface, the privacy icon representing that the receiving object is configured not to have the information sharing permission; and displaying the target information in the human-computer interaction interface, content in the target information being subjected to privacy protection processing, the privacy protection processing including any one of the following: mosaic addition, blurring, and occlusion superimposition.

In some embodiments, the display module 4554 is further configured to: after displaying the target information in the first display mode in the human-computer interaction interface of the receiving object method, perform any one of the following processing in a case that content in the target information is subjected to privacy protection processing: loading, in response to a preview trigger operation for the target information, a floating layer in a first sub-interface configured to display the target information in the human-computer interaction interface, the floating layer including content that has not been subjected to the privacy protection processing in the target information; hiding the floating layer in response to that a duration of displaying the floating layer reaches a duration threshold or the preview trigger operation is released; and switching, in response to a details trigger operation for the target information, the first sub-interface configured to display the target information in the human-computer interaction interface to a second sub-interface, the second sub-interface including the target information, the content in the target information having not been subjected to the privacy protection processing.

In some embodiments, the display module 4554 is further configured to: display an information card including the target information, the information card satisfying at least one of the following conditions: a style of the information card is different from a style of an information card displayed based on the second display mode; and a style of the target information in the information card displayed based on the first display mode is different from a style of the target information in the information card displayed based on the second display mode.

In some embodiments, the display module 4554 is further configured to: after displaying the target information in the first display mode in the human-computer interaction interface of the receiving object method, perform any one of the following processing: displaying prompt information, the prompt information being configured to prompt that the receiving object does not have the information sharing permission for the target information; and blocking execution of an operation for the target information, the operation requiring use of the information sharing permission.

In some embodiments, the display module 4554 is further configured to: display a session interface, the session interface including a plurality of pieces of information, private information in the plurality of pieces of information being displayed in a gray state, the private information being session information for which the receiving object does not have the information sharing permission; display at least one piece of information in a selected state in response to a selection operation in the session interface, the at least one piece of information including the target information; and block display of a functional control related to the information sharing permission in a case that the receiving object does not have the information sharing permission for any one of the at least one piece of information, to block a sensitive operation, a manner of the blocking display including at least one of the following: hiding the display and performing the display in a non-triggerable state, the sensitive operation including at least one of the following: an information sharing operation and an operation related to the information sharing operation.

In some embodiments, the display module 4554 is further configured to: display a session interface, the session interface including a plurality of pieces of information, private information in the plurality of pieces of information being displayed in a gray state, the private information being session information for which the receiving object does not have the information sharing permission; display at least one piece of information in a selected state in response to a selection operation in the session interface, the at least one piece of information including the target information; and perform privacy protection processing on content in the private information in response to a sensitive operation for the at least one piece of information, the sensitive operation including at least one of an information sharing operation and an operation related to the information sharing operation, the privacy protection processing including at least one of the following: deleting, in a case that the private information is text, a keyword related to privacy from the text; performing, in a case that the private information is an image, at least one of the following processing on content related to privacy in the image: mosaic processing, blurring, and occlusion addition processing; and silencing, in a case that the private information is audio, a part related to privacy in the audio.

In some embodiments, the display module 4554 is further configured to: display a session interface, the session interface including a plurality of pieces of information, private information in the plurality of pieces of information being displayed in a gray state, the private information being session information for which the receiving object does not have the information sharing permission; display at least one piece of information in a selected state in response to a selection operation in the session interface, the at least one piece of information including the target information; and display the prompt information in response to a sensitive operation for the at least one piece of information, the sensitive operation including at least one of an information sharing operation and an operation related to the information sharing operation.

In some embodiments, the display module 4554 is further configured to display first prompt information in response to that the receiving object does not have the information sharing permission for any one of the at least one piece of information, the first prompt information being configured to prompt that the receiving object does not have the information sharing permission for any one of the at least one piece of information; and display second prompt information in response to that the at least one piece of information is a plurality of pieces of information, and the receiving object does not have the information sharing permission for some pieces of information in the at least one piece of information, the second prompt information being configured to prompt that the receiving object does not have the information sharing permission for the some pieces of information.

In some embodiments, the display module 4554 is further configured to display a continue-to-share control in a case that the second prompt information is displayed; and transmit non-private information to the social network in response to a trigger operation for the continue-to-share control, the non-private information being information for which the receiving object have the information sharing permission in the at least one piece of information.

In some embodiments, the display module 4554 is further configured to: display at least one piece of information, the at least one piece of information including the target information; and display a screenshot result in response to a screenshot operation for at least one piece of information, in the screenshot result, information for which the receiving object does not have the information sharing permission being subjected to the privacy protection processing, the privacy protection processing including at least one of the following: mosaic processing, blurring, and occlusion addition processing.

In some embodiments, as shown in FIG. 3, software modules in a privacy protection apparatus 455-3 for a social network stored in a memory 450 may include: a second configuration module 4555, configured to display, in response to a configuration operation performed by a target object for an information sharing permission for the social network, a configuration result of the information sharing permission; and a second transmitting module 4556, configured to transmit, in response to a trigger operation for transmitting target information, the target information to the social network, in a case that the configuration result represents that a receiving object has or does not have the information sharing permission for the target information, that the receiving object does not have the information sharing permission for the target information being represented in a first display mode in a human-computer interaction interface of the receiving object, and that the receiving object has the information sharing permission for the target information being represented in a second display mode, the first display mode being different from the second display mode.

An embodiment of this application provides a computer program product, including a computer program or computer-executable instructions, the computer-executable instructions being stored in a computer-readable storage medium. A processor of an electronic device reads the computer-executable instructions from the computer-readable storage medium. The processor executes the computer-executable instructions, to cause the electronic device to perform the foregoing privacy protection method for a social network in the embodiments of this application.

An embodiment of this application provides a computer-readable storage medium having computer-executable instructions stored therein. When executed by a processor, the computer-executable instructions cause the processor to perform the privacy protection method for a social network provided in the embodiments of this application, for example, the privacy protection method for a social network shown in FIG. 4A to FIG. 4C.

In some embodiments, the computer-readable storage medium may be a memory such as a FRAM, a ROM, a PROM, an EPROM, an EEPROM, a flash memory, a magnetic surface memory, an optical disk, or a CD-ROM, or may be various devices including one or any combination of the foregoing memories.

In some embodiments, the computer-executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the computer-executable instructions may but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the computer-executable instructions may be deployed for execution on one electronic device, execution on a plurality of electronic devices located at one location, or execution on a plurality of electronic devices that are distributed at a plurality of locations and that are interconnected through a communication network.

In conclusion, through the embodiments of this application, the information sharing permission is configured, to prevent transmitted information from being shared at will, which effectively guarantees the privacy security of information. In addition, different display modes are adopted for information for which an information sharing permission is configured and information for which no information sharing permission is configured, which can improve the sense of security of a transmit end in terms of the user experience.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A privacy protection method, performed by an electronic device, comprising:

displaying, in response to a configuration operation with respect to an information sharing permission for a social network, a configuration result of the information sharing permission; and displaying target information in response to a trigger operation for transmitting the target information, including:

displaying the target information in a first display mode in response to the configuration result representing that the target information is configured with the information sharing permission, the first display mode indicating that an information re-sharing operation by a recipient of the target information on the target information is restricted according to the information sharing permission, the information re-sharing operation comprising at least one of a forwarding operation, an add-to-favorites operation, a saving operation, a sharing link generation operation, a two-dimensional code generation operation, or a screenshot operation; and displaying the target information in a second display mode different from the first display mode in response to the configuration result representing that the target information is not configured with the information sharing permission, the second display mode indicating that the information re-sharing operation by the recipient of the target information on the target information is not restricted.

2. The method according to claim 1, wherein displaying, in response to the configuration operation with respect to the information sharing permission for the social network, the configuration result of the information sharing permission includes:

displaying an address book interface, the address book interface including an address book of a target object transmitting the target information;

displaying at least one object in a selected state in response to a selection operation with respect to the address book;

in response to a configuration operation with respect to an information sharing permission for the at least one object, displaying, in the address book, a configuration result of the information sharing permission corresponding to the at least one object.

3. The method according to claim 2, wherein, in response to a configuration operation for an information sharing permission for the at least one object, displaying, in the address book, the configuration result of the information sharing permission corresponding to the at least one object includes:

displaying a permission switch control, the permission switch control including permission switches corresponding to a plurality of information types, respectively; and in response to a configuration operation of switching off a permission switch corresponding to one information type of the plurality of information types, for each object of the at least one object:

displaying an information type identifier of the first information type in a region corresponding to the object in the address book, to represent that the object does not have the information sharing permission for the one information type.

4. The method according to claim 2, wherein displaying, in the address book, the configuration result of the information sharing permission corresponding to the at least one object includes, for each object of the at least one object:

displaying an information type identifier of each of a plurality of information types in a region corresponding to the object in the address book, to represent that the object does not have the information sharing permission for all of the plurality of information types.

5. The method according to claim 2, wherein:

the address book includes at least one of an object list, an object group list, or a group chat group list; and displaying the at least one object in the selected state in response to the selection operation for the address book includes:

displaying the at least one object in the selected state in response to a selection operation for the object list;

displaying, in response to a viewing operation for one object group in the object group list, a plurality of objects in the one object group, and displaying, in response to a selection operation for the at least one object in the one object group, the at least one object in the selected state; and displaying, in response to a viewing operation for one group chat group in the group chat group list, a plurality of group chats in the one group chat group, and displaying, in response to a selection operation for at least one group chat in the one group chat group, the at least one group chat in a selected state, each group chat including a plurality of objects.

6. The method according to claim 1, wherein an effect-taking moment of the information sharing permission includes at least one of:

a change moment, at which the information sharing permission is generated or updated according to the configuration operation; or a specified moment later than the change moment.

7. The method according to claim 1, wherein displaying, in response to the configuration operation with respect to the information sharing permission for the social network, the configuration result of the information sharing permission includes:

displaying a setting interface of a social object, the setting interface including one or more dimensions for configuring the information sharing permission, the social object having a social relationship with a target object of the target information, and the one or more dimensions including at least one of an information type or a time period; and displaying, in response to a configuration operation based on at least one dimension of the one or more dimensions, a configuration result of the information sharing permission corresponding to the at least one dimension, the configuration result recording at least one of:

information indicating that the social object does not have the information sharing permission for the information type, or information indicating that the social object is prohibited from using the information sharing permission in the time period.

8. The method according to claim 7, wherein:

the at least one dimension includes the information type; and displaying, in response to the configuration operation based on the at least one dimension, the configuration result of the information sharing permission corresponding to the at least one dimension includes:

displaying a permission switch control, the permission switch control including permission switches corresponding to a plurality of information types, respectively; and displaying, in response to a configuration operation of switching off one of the permission switches that corresponds to one information type of the plurality of information types, an information type identifier of the one information type in the setting interface of the social object, to represent that the social object does not have the information sharing permission for the one information type.

9. The method according to claim 1, wherein displaying, in response to the configuration operation with respect to the information sharing permission for the social network, the configuration result of the information sharing permission includes:

displaying a setting interface of a social group to which a target object belongs, the target object being an object transmitting the target information, the setting interface including one or more dimensions for configuring the information sharing permission, the one or more dimensions including at least one of an information type, an identity, or a time period; and displaying, in response to a configuration operation based on at least one dimension of the one or more dimensions, a configuration result of the information sharing permission corresponding to the at least one dimension, the configuration result recording at least one of:

information indicating that the information type for which use of the information sharing permission is prohibited, information indicating that another object in the social group other than the target object is prohibited from using the information sharing permission in the time period, or information indicating that an object having the identity in the social group is prohibited from using the information sharing permission.

10. The method according to claim 9, wherein:

the at least one dimension includes the identity; and displaying, in response to the configuration operation based on the at least one dimension, the configuration result of the information sharing permission corresponding to the at least one dimension includes:

displaying a permission switch control, the permission switch control including permission switches corresponding to a plurality of identities, respectively; and displaying, in response to a configuration operation of switching off one of the permission switches that corresponds to one identity of the plurality of identities, an identity identifier of the one identity in the setting interface of the social group, to represent that an object of the one identity does not have the information sharing permission.

11. The method according to claim 1, wherein displaying, in response to the configuration operation with respect to the information sharing permission for the social network, the configuration result of the information sharing permission includes:

displaying a configuration interface of the information sharing permission, the configuration interface including configuration entries corresponding to a plurality of information types, respectively;

displaying an object addition interface in response to a trigger operation with respect to a configuration entry of one information type of the plurality of information types, the object addition interface including an object set, and an object in the object set not having the information sharing permission for the one information type; and adding at least one object to the object set corresponding to the one information type in response to a configuration operation of adding the at least one object to the object set.

12. The method according to claim 11, further comprising:

displaying an information type identifier of the one information type in a region corresponding to each object in the object set, to represent that the object in the object set does not have the information sharing permission for the second information type.

13. The method according to claim 1, wherein displaying, in response to the configuration operation with respect to the information sharing permission for the social network, the configuration result of the information sharing permission includes:

displaying a set time period in response to a time period setting operation for the information sharing permission; and displaying the configuration result of the information sharing permission in response to a configuration operation of updating the information sharing permission based on the time period, the configuration result recording information indicating that an object receiving any information is prohibited from using the information sharing permission in the time period.

14. An electronic device comprising:

one or more processors; and one or more memories storing one or more computer-executable instructions that, when executed by the one or more processors, cause the electronic device to:

display, in response to a configuration operation with respect to an information sharing permission for a social network, a configuration result of the information sharing permission; and display target information in response to a trigger operation for transmitting the target information, including:

displaying the target information in a first display mode in response to the configuration result representing that the target information is configured with the information sharing permission, the first display mode indicating that an information re-sharing operation by a recipient of the target information on the target information is restricted according to the information sharing permission, the information re-sharing operation comprising at least one of a forwarding operation, an add-to-favorites operation, a saving operation, a sharing link generation operation, a two-dimensional code generation operation, or a screenshot operation; and displaying the target information in a second display mode different from the first display mode in response to the configuration result representing that the target information is not configured with the information sharing permission, the second display mode indicating that the information re-sharing operation by the recipient of the target information on the target information is not restricted.

15. The electronic device according to claim 14, wherein the one or more instructions, when executed by the one or more processors, further cause the electronic device to:

display an address book interface, the address book interface including an address book of a target object transmitting the target information;

display at least one object in a selected state in response to a selection operation with respect to the address book;

in response to a configuration operation with respect to an information sharing permission for the at least one object, display, in the address book, a configuration result of the information sharing permission corresponding to the at least one object.

16. The electronic device according to claim 15, wherein the one or more instructions, when executed by the one or more processors, further cause the electronic device to:

display a permission switch control, the permission switch control including permission switches corresponding to a plurality of information types, respectively; and in response to a configuration operation of switching off a permission switch corresponding to one information type of the plurality of information types, for each object of the at least one object:

display an information type identifier of the first information type in a region corresponding to the object in the address book, to represent that the object does not have the information sharing permission for the one information type.

17. The electronic device according to claim 15, wherein the one or more instructions, when executed by the one or more processors, further cause the electronic device to:

display an information type identifier of each of a plurality of information types in a region corresponding to the object in the address book, to represent that the object does not have the information sharing permission for all of the plurality of information types.

18. The electronic device according to claim 15, wherein:

the address book includes at least one of an object list, an object group list, or a group chat group list; and the one or more instructions, when executed by the one or more processors, further cause the electronic device to:

display the at least one object in the selected state in response to a selection operation for the object list;

display, in response to a viewing operation for one object group in the object group list, a plurality of objects in the one object group, and displaying, in response to a selection operation for the at least one object in the one object group, the at least one object in the selected state; and display, in response to a viewing operation for one group chat group in the group chat group list, a plurality of group chats in the one group chat group, and displaying, in response to a selection operation for at least one group chat in the one group chat group, the at least one group chat in a selected state, each group chat including a plurality of objects.

19. The electronic device according to claim 14, wherein an effect-taking moment of the information sharing permission includes at least one of:

a change moment, at which the information sharing permission is generated or updated according to the configuration operation; or a specified moment later than the change moment.

20. A non-transitory computer-readable storage medium storing one or more computer-executable instructions that, when executed by one or more processors, cause the one or more processors to:

display, in response to a configuration operation with respect to an information sharing permission for a social network, a configuration result of the information sharing permission; and display target information in response to a trigger operation for transmitting the target information, including:

displaying the target information in a first display mode in response to the configuration result representing that the target information is configured with the information sharing permission, the first display mode indicating that an information re-sharing operation by a recipient of the target information on the target information is restricted according to the information sharing permission, the information re-sharing operation comprising at least one of a forwarding operation, an add-to-favorites operation, a saving operation, a sharing link generation operation, a two-dimensional code generation operation, or a screenshot operation; and displaying the target information in a second display mode different from the first display mode in response to the configuration result representing that the target information is not configured with the information sharing permission, the second display mode indicating that the information re-sharing operation by the recipient of the target information on the target information is not restricted.

* * * * *